(12) United States Patent
Sasamoto

(10) Patent No.: US 7,258,329 B2
(45) Date of Patent: Aug. 21, 2007

(54) REACTANT GAS HUMIDIFICATION APPARATUS AND REACTANT GAS HUMIDIFICATION METHOD

(75) Inventor: Kazuya Sasamoto, Tochigi-ken (JP)

(73) Assignee: Honda Motor Co., Ltd., Tokyo (JP)

( * ) Notice: Subject to any disclaimer, the term of this patent is extended or adjusted under 35 U.S.C. 154(b) by 72 days.

(21) Appl. No.: 11/149,470

(22) Filed: Jun. 8, 2005

(65) Prior Publication Data
US 2005/0275120 A1 Dec. 15, 2005

(30) Foreign Application Priority Data
Jun. 15, 2004 (JP) ............... 2004-176478
Jun. 17, 2004 (JP) ............... 2004-180044

(51) Int. Cl.
*B01F 3/04* (2006.01)
(52) U.S. Cl. ...................... 261/104; 261/107
(58) Field of Classification Search ............... 261/100, 261/101, 102, 104, 107, DIG. 65
See application file for complete search history.

(56) References Cited

U.S. PATENT DOCUMENTS

| | | | | |
|---|---|---|---|---|
| 3,735,559 A | * | 5/1973 | Salemme | .............. 95/52 |
| 5,996,976 A | * | 12/1999 | Murphy et al. | .............. 261/104 |
| 6,666,909 B1 | * | 12/2003 | TeGrotenhuis et al. | ........ 95/273 |
| 6,875,247 B2 | * | 4/2005 | TeGrotenhuis et al. | ........ 55/319 |
| 2002/0024155 A1 | * | 2/2002 | Kusano et al. | .............. 261/104 |
| 2004/0084789 A1 | * | 5/2004 | Yan et al. | .................... 261/107 |
| 2005/0084731 A1 | * | 4/2005 | Nishimura et al. | ........... 429/34 |

FOREIGN PATENT DOCUMENTS

| | | |
|---|---|---|
| JP | 06-124722 | 5/1994 |
| JP | 08-138704 | 5/1996 |
| JP | 10-172591 | 6/1998 |
| JP | 10-172592 | 6/1998 |
| JP | 11-185777 | 7/1999 |
| JP | 2003-187839 | 7/2003 |

\* cited by examiner

*Primary Examiner*—Scott Bushey
(74) *Attorney, Agent, or Firm*—Fish & Richardson P.C.

(57) ABSTRACT

A reactant gas humidification apparatus includes a first separator provided on one surface of a water permeable membrane and a second separator provided on the other surface of the water permeable membrane. The first separator has first and second flow fields on both surfaces for supplying an air before reaction as the same reactant gas. Further, the second separator has third and fourth flow fields on both surfaces for supplying an off gas as the same humidifying fluid. The off gas is used for humidifying the air before reaction.

18 Claims, 21 Drawing Sheets

REACTANT GAS HUMIDIFICATION APPARATUS AND REACTANT GAS HUMIDIFICATION METHOD

BACKGROUND OF THE INVENTION

1. Field of the Invention

The present invention relates to a reactant gas humidification apparatus and a reactant gas humidification method in which a reactant gas is supplied to one surface of a water permeable membrane, and a humidifying fluid is supplied to the other surface of the water permeable membrane for humidifying the reactant gas.

2. Description of the Related Art

For example, a solid polymer electrolyte fuel cell employs a membrane electrode assembly (MEA) which includes two electrodes (anode and cathode), and an electrolyte membrane interposed between the electrodes. The electrolyte membrane is a polymer ion exchange membrane. The membrane electrode assembly is interposed between a pair of separators. The membrane electrode assembly and the separators make up a power generation cell for generating electricity. In use, a plurality of the power generation cells are stacked together to form a fuel cell stack.

In the fuel cell, a fuel gas such as a gas chiefly containing hydrogen (hereinafter also referred to as the "hydrogen-containing gas") is supplied to the anode. A gas chiefly containing oxygen or the air (hereinafter also referred to as the "oxygen-containing gas") is supplied to the cathode. The catalyst of the anode induces a chemical reaction of the fuel gas to split the hydrogen molecule into hydrogen ions and electrons. The hydrogen ions move toward the cathode through the electrolyte membrane, and the electrons flow through an external circuit to the cathode, creating a DC electrical energy.

In the fuel cell, in order to achieve the efficient power generation performance, it is necessary to maintain the suitable humidified state of the electrolyte membrane. For this purpose, in the known technique, a humidification apparatus is provided for humidifying the fuel gas or the oxygen-containing gas in advance using water, and the humidification apparatus is connected to the fuel cell for supplying the humidified fuel gas or the oxygen-containing gas to the fuel cell.

For example, Japanese Laid-Open Patent Publication No. 2003-187839 discloses a fuel cell humidification apparatus as shown in FIG. 21. According to the disclosure, a humidification membrane 1 is interposed between a pair of resin plate members 2. A plurality of the resin plate members 2 and the humidification membranes 1 are stacked together to form a stack. A humidification outbound flow field 3 for the air supplied to the air electrode of the fuel cell is provided between one surface of the humidification membrane 1 and one of the plate members 2, and a humidification inbound flow field 4 for the off gas discharged from the air electrode of the fuel cell after reaction is provided between the other surface of the humidification membrane 1 and the other plate member 2.

However, in the humidification apparatus, since the air before reaction is supplied to the humidification outbound flow field 3 on one surface of the humidification membrane 1, and the off gas is supplied to the humidification inbound flow field 4 on the other surface of the humidification membrane 1, humidification of the air before reaction by the off gas is only carried out near the humidification membrane 1. Therefore, it is not possible to efficiently humidify the entire air before reaction flowing through the humidification outbound flow field 3 by the water in the off gas flowing through the humidification inbound flow field 4.

In the technique, in order to achieve sufficient humidification of the air before reaction, the overall size of the humidification apparatus needs to be significantly large. Thus, a large space is required for installation of the humidification apparatus. For example, it is not possible to mount the large humidification apparatus in a vehicle.

Further, in the humidification apparatus, a plurality of plate members 2 and humidification membranes 1 are stacked together, and an outbound passage for supplying the air to each of the humidification outbound flow fields 3 and an inbound passage for supplying the off gas to each of the humidification inbound flow fields 4 extend through the stack of the plate members 2 and the humidification membranes 1 in the stacking direction. In the structure, seal members are provided around the outbound passage and the inbound passage for preventing leakage of the air or the off gas.

In order to achieve improvement in the humidification efficiency, for example, in some applications, each of the humidification outbound flow field 3 and the humidification inbound flow field 4 includes a plurality of serpentine flow grooves or the like. Thus, when two plate members 2 are provided such that the humidification membrane 1 is interposed between the plate members 2, the flow grooves of the humidification outbound flow field 3 and the flow grooves of the humidification outbound flow field 4 intersect with each other in some areas. As a result, for example, the seal member may be deformed downwardly by its weight into the flow grooves. Thus, the desired sealing performance cannot be maintained. Further, the rigidity in the stacking direction may be lowered disadvantageously.

SUMMARY OF THE INVENTION

A general object of the present invention is to provide a reactant gas humidification apparatus and a reactant gas humidification method which make it possible to efficiently and reliably humidify reactant gases, and achieve reduction in the overall size of the humidification apparatus easily.

A main object of the present invention is to provide a reactant gas humidification apparatus which makes it possible to maintain the pressure applied to the surface of a seal to achieve improvement in the sealing performance, and maintain the suitable rigidity in the stacking direction.

The present invention relates to a reactant gas humidification apparatus for humidifying at least one reactant gas supplied to a solid polymer electrolyte fuel cell by a humidifying fluid, and the humidification apparatus includes a first separator provided on one surface of a water permeable membrane, a second separator provided on the other surface of the water permeable membrane. At least the first separator has a first flow field on a first surface facing the one surface of the water permeable membrane and a second flow field on a second surface opposite to the first surface for allowing the same humidifying fluid or the same reactant gas to flow along the first flow field and the second flow field.

Preferably, the second separator has a third flow field on a third surface facing the other surface of the water permeable membrane and a fourth flow field on a fourth surface opposite to the third surface for allowing the same reactant gas or the same humidifying fluid to flow along the third flow field and the fourth flow field.

Preferably, the first separator and the second separator are stacked together alternately to form a stack such that the water permeable membrane is interposed between the first separator and the second separator.

Preferably, the first separator is formed by corrugating a metal plate to have the first flow field and the second flow field, and the second separator is formed by corrugating a metal plate to have the third flow field and the fourth flow field.

Preferably, a reactant gas passage extends through the first separator and the second separator for allowing the reactant gas to flow in a stacking direction, and to be supplied to predetermined two of the first through fourth flow fields, and a humidifying fluid passage extends through the first separator and the second separator for allowing the humidifying fluid to flow in the stacking direction and to be supplied to the remaining two of the first through fourth flow fields.

Preferably, a first seal member for closing the first flow field is provided at least near an inlet of the first flow field, a second seal member for closing the second flow field is provided at least near an inlet of the second flow field, and offset from the first seal member, a third seal member for closing the third flow field is provided at least near an inlet of the third flow field, and a fourth seal member for closing the fourth flow field is provided at least near an inlet of the fourth flow field, and offset from the third seal member.

Preferably, recesses are formed in respective corrugated protrusions on both surfaces of the first separator, and the first seal member is provided in the recess on the first surface, and the second seal member is provided in the recess on the second surface, and recesses are formed in respective corrugated protrusions on both surfaces of the second separator, and the third seal member is provided in the recess on the third surface, and the fourth seal member is provided in the recess on the fourth surface.

Preferably, the first separator has a through hole for connecting the first flow field and the second flow field, and the second separator has a through hole for connecting the third flow field and the fourth flow field.

Further, the present invention relates to a reactant gas humidification apparatus for humidifying at least one reactant gas supplied to a solid polymer electrolyte fuel cell by a humidifying fluid, and the humidification apparatus includes a first separator provided on one surface of a water permeable membrane and having a plurality of first flow grooves for supplying the reactant gas to the one surface of the water permeable membrane, and a second separator provided on the other surface of the water permeable membrane and having a plurality of second flow grooves for supplying the humidifying fluid to the other surface of the water permeable membrane.

A first passage extends through the first and second separators in a stacking direction, and is connected to the first flow grooves. A second passage extends through the first and second separators in the stacking direction, and is connected to the second flow grooves. At least the first separator has a seal near the first passage. The seal is overlapped with a straight ridge provided between the second flow grooves of the second separator in the stacking direction, and the straight ridge has a flat upper surface extending along a seal surface of the seal.

Preferably, the seal width of the seal is smaller than the width of the straight ridge. Thus, since the rigid first and second separators contact each other, the water permeable membrane is sandwiched between the first and second separators reliably, and improvement in the rigidity in the stacking direction is achieved. Further, since sealing is carried out at the straight ridge which is outside the vapor permeable surface, in the surfaces of the first and second separators, it is possible to efficiently increase the effective surface area used for permeation of the vapor.

Preferably, the flow direction of the first flow grooves where the seal is provided intersects with the flow direction of the second flow grooves in an area of the straight ridge. Preferably, the seal is provided in an area of the first flow grooves. Thus, in the surfaces of the first and second separators, it is possible to efficiently increase the effective surface area used for permeation of the vapor, and improvement in the vapor permeability is achieved easily.

Further, the present invention relates to a reactant gas humidification method for humidifying at least one reactant gas supplied to a solid polymer electrolyte fuel cell by a humidifying fluid. In the method, the same reactant gas is supplied to a first flow field and a second flow field on both surfaces of a first separator provided on one surface of a water permeable membrane. Further, the same humidifying fluid is supplied to a third flow field and a fourth flow field on both surfaces of a second separator provided on the other surface of the water permeable membrane for humidifying the reactant gas by the humidifying fluid.

Preferably, a reactant gas passage extends through the first separator and the second separator in a stacking direction, and the reactant gas is supplied through the reactant gas passage to the second flow field of the first separator, and the reactant gas moves from the second flow field to the first flow field through a first through hole formed in said first separator, and thereafter, some of the reactant gas separately flows along the second flow field through a second through hole formed in the first separator. Further, preferably, a humidifying fluid passage extends through the first separator and the second separator in the stacking direction, and the humidifying fluid is supplied through the humidifying fluid passage to the fourth flow field of the second separator, and the humidifying fluid moves from the fourth flow field to the third flow field through a third through hole formed in the second separator, and thereafter, some of the humidifying fluid separately flows along the fourth flow field through a fourth through hole formed in the second separator.

According to the present invention, the first flow field and the second flow field are provided at least on the first surface and the second surface of the first separator for supplying the same reactant gas or the same humidification fluid to achieve suitable humidification of the reactant gas. Thus, it is possible to effectively and reliably humidify the reactant gas, and reduce the overall size of the humidification apparatus easily.

Further, according to the present invention, the seal of the first separator is overlapped with the flat surface of the straight ridge of the second separator. Therefore, the seal is reliably supported by the straight ridge. With the simple structure, the pressure applied to the surface of the seal is maintained, improvement in the sealing performance is achieved, and the suitable rigidity in the stacking direction is maintained. Further, the entire sealing surface is the flat, and does not include any step. In particular, for example, it is possible to prevent the increase of the pressure loss due to deformation of the water permeable membrane or leakage due to the deformation of the seal.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
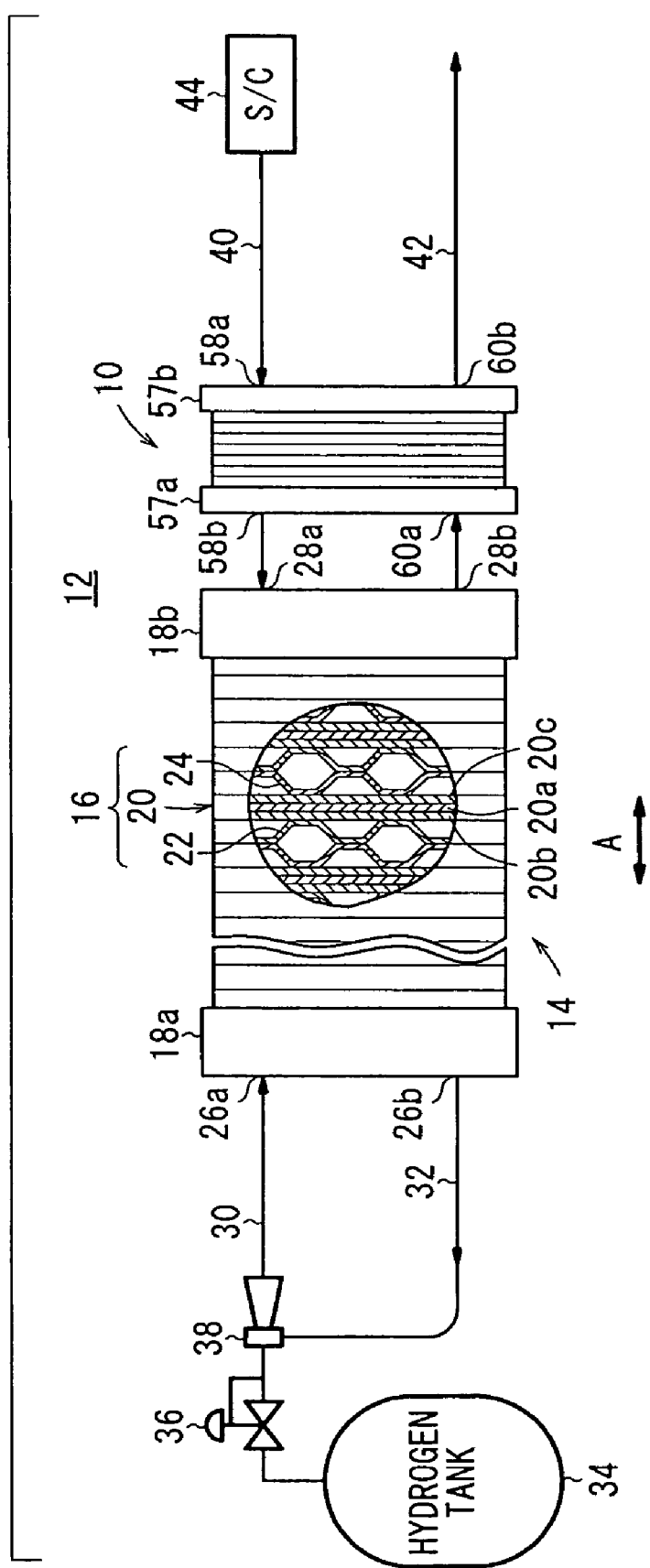
FIG. 1 is a view schematically showing structure of a fuel cell system including a humidification apparatus according to a first embodiment of the present invention.

FIG. 1 is a view schematically showing structure of a fuel cell system 12 including a humidification apparatus 10 according to a first embodiment of the present invention.

For example, the fuel cell system 12 is mounted in a vehicle such as an automobile, and includes a fuel cell stack 14. The fuel cell stack 14 includes a plurality of power generation cells (solid polymer electrolyte fuel cells) 16 stacked in a direction indicated by an arrow A. At opposite ends of the power generation cells 16 in stacking direction, end plates 18a, 18b are provided. The end plates 18a, 18b are tightened together in the stacking direction using tightening bolts (not shown).

For example, the power generation cell 16 includes a membrane electrode assembly 20 and a pair of separators 22, 24 sandwiching the membrane electrode assembly 20. The membrane electrode assembly 20 includes an anode 20b, a cathode 20c, and a solid polymer electrolyte membrane 20a interposed between the anode 20b and the cathode 20c. As a fuel gas, for example, a hydrogen gas is supplied to the anode 20b. As an oxygen-containing gas, for example, the air containing oxygen is supplied to the cathode 20c.

The end plate 18a has a hydrogen supply port 26a for supplying the hydrogen gas to the power generation cells 16, and a hydrogen discharge port 26b for discharging the exhaust gas from the power generation cells 16. The exhaust gas contains the hydrogen gas that has not been consumed in the reaction for power generation. The end plate 18b has an air supply port 28a for supplying the air to the power generation cells 16, and an air discharge port 28b for discharging the air (hereinafter also referred to as the "off gas") from the power generation cells 16 to the outside of the fuel cell stack 14.

The fuel cell system 12 includes a hydrogen supply channel 30 for supplying the hydrogen gas to the fuel cell stack 14, and a hydrogen circulation channel 32 for guiding the exhaust gas containing the unconsumed hydrogen gas discharged from the fuel cell stack 14 to an intermediate position of the hydrogen supply channel 30 for supplying the exhaust gas containing the unconsumed hydrogen gas to the fuel cell stack 14 again.

A hydrogen tank 34 for storing high pressure hydrogen, and a regulator 36 for reducing the pressure of the hydrogen gas supplied from the hydrogen tank 34, and an ejector 38 for sucking the exhaust gas from the hydrogen circulation channel 32 such that the exhaust gas flows back to the fuel cell stack 14 are provided in the hydrogen supply channel 30.

Further, the fuel cell system 12 includes an air supply channel 40 for supplying the air to the fuel cell stack 14 and an air discharge channel 42 for discharging the off gas from the fuel cell stack 14 to the outside. A supercharger (or pump) 44 for compressing the air supplied to the fuel cell stack 14 is provided in the air supply channel 40.

Figure 2:
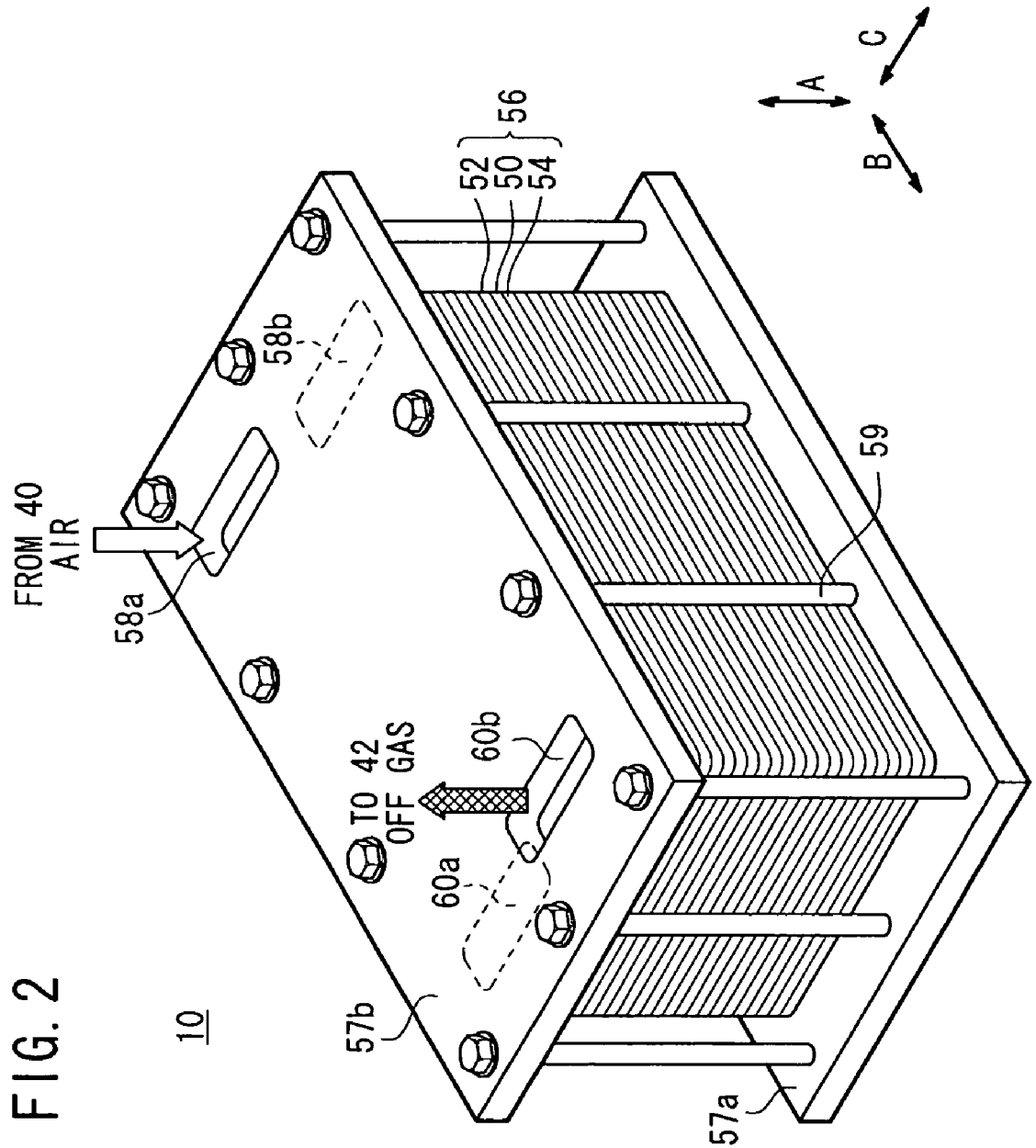
FIG. 2 is a perspective view schematically showing the humidification apparatus.
Figure 3:
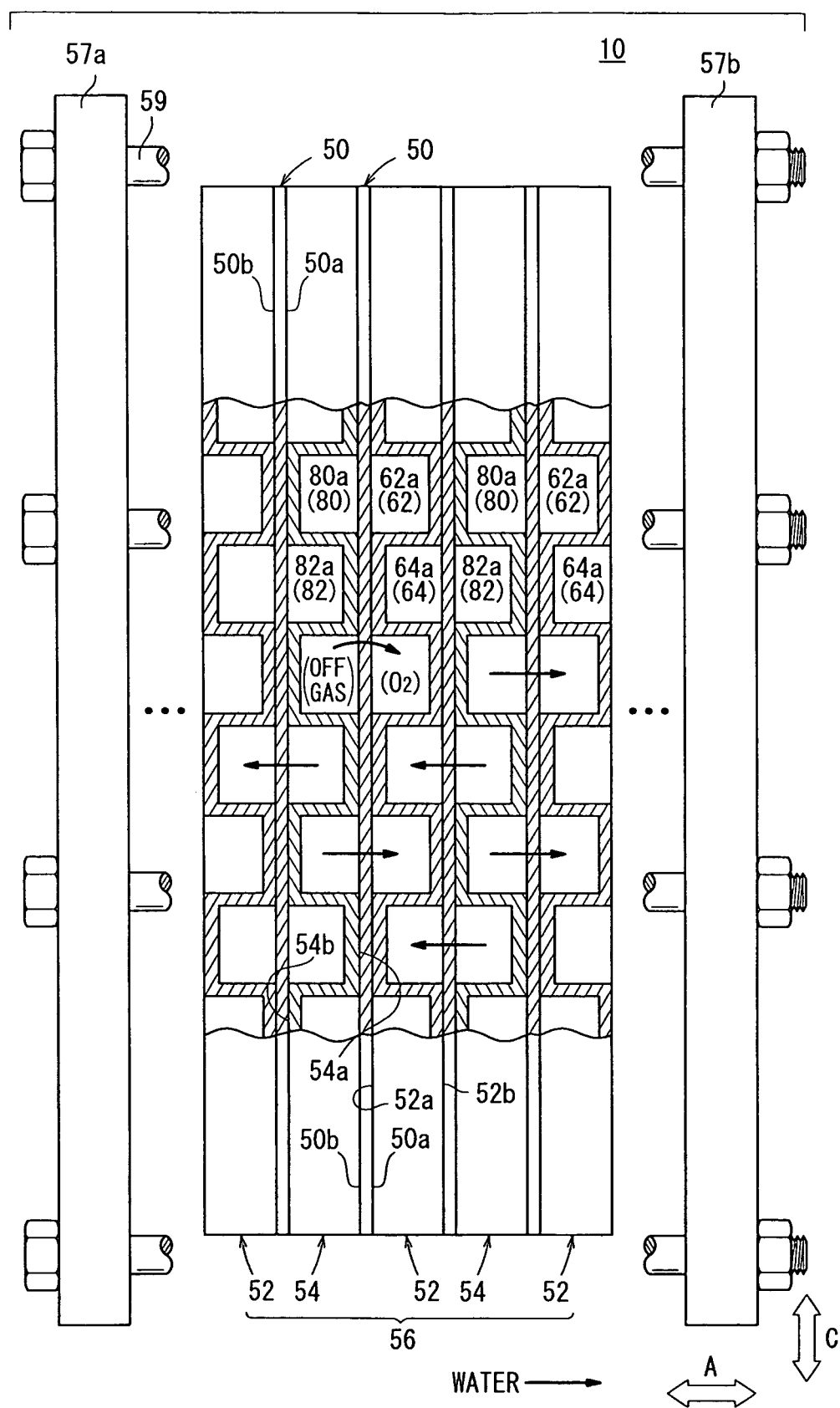
FIG. 3 is a side view showing part of cross section of the humidification apparatus.

The humidification apparatus 10 is attached to the fuel cell stack 14. The humidification apparatus 10 is connected to the end plate 18b. As shown in FIGS. 2 and 3, the humidification apparatus 10 includes first separators 52 and second separators 54 that are stacked alternately in the direction indicated by an arrow A. Water permeable membranes 50 are sandwiched between the first and second separators 52, 54. The first separator 52 is formed on one surface 50a of the water permeable membrane 50, and the second separator 54 is formed on the other surface 50b of the water permeable membrane 50. The first and second separators 52, 54, that are stacked alternately in the stacking direction indicated by the arrow A, and the water permeable membranes 50 interposed between the first and second separators 52, 54 form a stack body 56.

At opposite ends of the stack body 56 in the direction indicated by the arrow A, end plates 57a, 57b are provided. The components between the end plates 57a, 57b are tightened together by a plurality of tightening rods 59. The first and second separators 52, 54 are corrugated metal plates. Alternatively, the first and second separators 52, 54 may be fabricated by the cutting process or the like using carbon plates.

Figure 4:
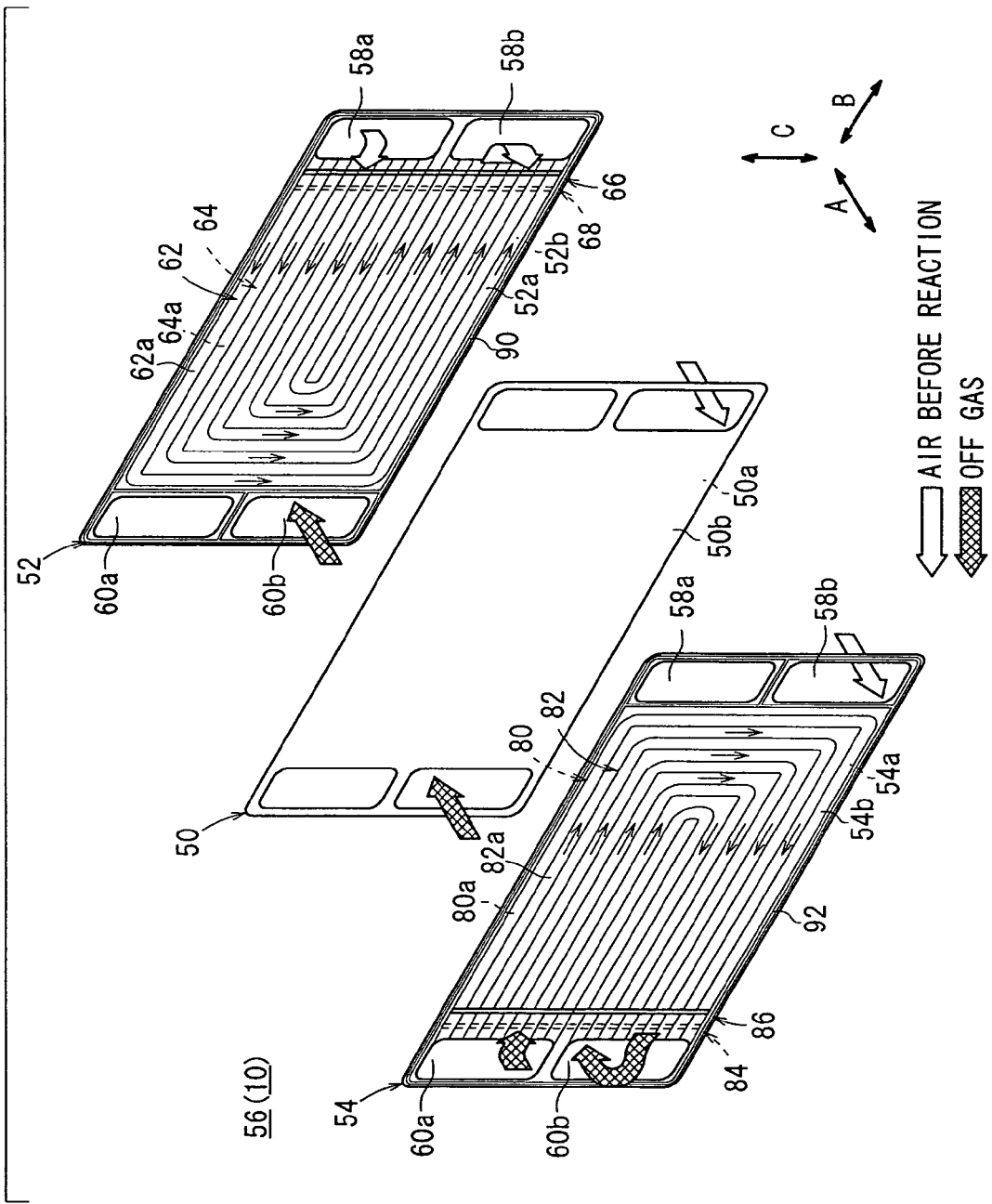
FIG. 4 is an exploded perspective view showing main components of the humidification apparatus.

As shown in FIG. 4, at one end of the stack body 56 in the direction indicated by an arrow B, an air supply passage (reactant gas passage, first passage) 58a for supplying the air before reaction (one reactant gas), and an air discharge passage (reactant gas passage, first passage) 58b for discharging the humidified air before reaction are arranged vertically in the direction indicated by an arrow C. The air supply passage 58a and the air discharge passage 58b extend through the stack body 56 in the direction indicated by the arrow A.

At the other end of the stack body 56 in the direction indicated by the arrow B, an off gas supply passage (humidifying fluid passage, second passage) 60a for supplying the off gas, and an off gas discharge passage (humidified fluid passage, second passage) 60b for discharging the off gas after used for humidifying the air before reaction are arranged vertically.

As shown in FIG. 1, the air supply passage 58a is connected to the air supply channel 40, the air discharge passage 58b is connected to the air supply port 28a of the fuel cell stack 14, the off gas supply passage 60a is connected to the air discharge port 28b of the fuel cell stack 14, and the off gas discharge passage 60b is connected to the air discharge channel 42.

As shown in FIG. 4, the first separator 52 has a first flow field 62 on a first surface 52a facing one surface 50a of the water permeable membrane 50. The first flow field 62 includes a plurality of grooves (first flow grooves) 62a curved in a substantially U-shape on the first surface 52a. The grooves 62a of the first flow field 62 are connected between the air supply passage 58a and the air discharge passage 58b.

Further, the first separator 52 has a second flow field 64 on a second surface 52b opposite to the first surface 52a. The second flow field 64 includes a plurality of grooves 64a curved in a substantially U-shape on the second surface 52b. The grooves 64a of the second flow field 64 are connected between the air supply passage 58a and the air discharge passage 58b. The grooves 64a of the second flow field 64 and the grooves 62a of the first flow field 62 are formed alternately, and have a corrugated shape as a whole.

A first seal member (seal) 66 for closing the first flow field 62 is provided near the air supply passage 58a (near an inlet) of the first flow field 62, and near the air discharge passage 58b (near an outlet) of the first flow field 62. Further, a second seal member 68 for closing the second flow field 64 is provided near the air supply passage 58a, and near the air discharge passage 58b.

Figure 5:
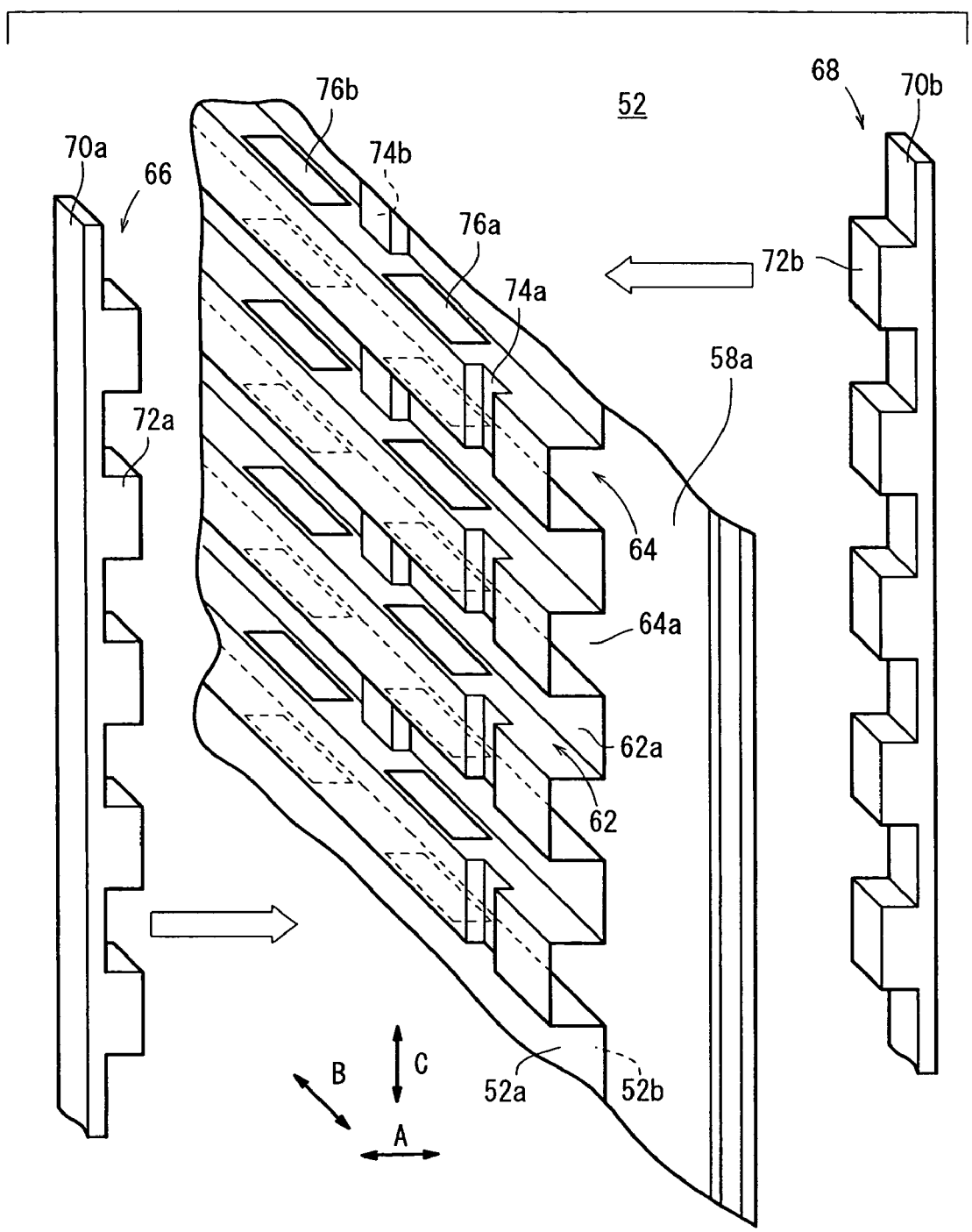
FIG. 5 is an enlarged exploded perspective view showing part of a first separator of the humidification apparatus.

In FIG. 5, the first and second seal members 66, 68 are made of elastic material such as rubber. A plurality of expansions 72a, 72b are formed integrally on plate sections (seal sections) 70a, 70b, respectively. Recesses 74a, 74b are formed in ridges (protrusions) on both sides of the corrugated grooves 62a of the first separator 52, respectively. The recesses 74a are arranged in a line in the direction indicated by the arrow C from a position near the inlet of the first flow field 62 to a position near the outlet of the first flow field 62. The recesses 74b are arranged in a line in the direction indicated by the arrow C from a position near the inlet of the second flow field 64 to a position near the outlet of the second flow field 64. In the illustrated embodiment, the recesses 74b are offset inwardly from the recesses 74a. Alternatively, the recesses 74a and the recesses 74b may be provided at the same position on both surfaces of the first separator 52.

The plate section 70a of the first seal member 66 is inserted into the recesses 74a, and the expansions 72a of the first seal member 66 are inserted into the grooves 62a of the first flow field 62. The plate section 70a of the first seal member 66 and the surfaces of the ridges (protrusions) of the first flow field 62 on the first surface 52a are in the same plane. The expansions 72a close the first flow field 62.

The plate section 70b of the second seal member 68 is inserted into the recesses 74b, and the expansions 72b of the second seal member 68 are inserted into the grooves 64a of the second flow field 64 to close the second flow field 64.

Figure 6:
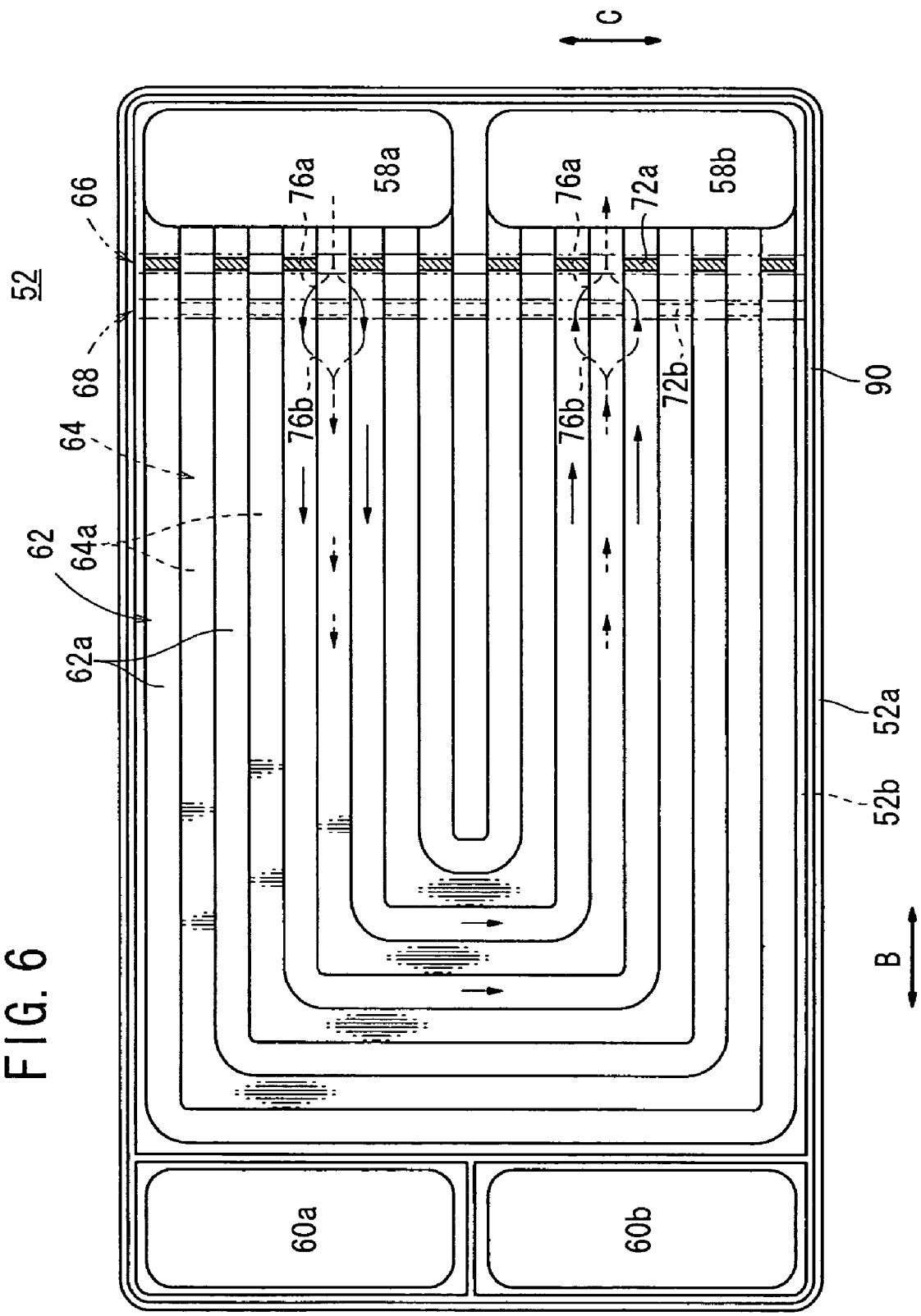
FIG. 6 is a front view showing the first separator.

As shown in FIGS. 5 and 6, in the first separator 52, a partition wall dividing the first flow field 62 and the second flow field 64 has a first through hole 76a. The first through hole 76a is positioned between the first seal member 66 and the second seal member 68, and connects the first flow field 62 and the second flow field 64. Further, in the first separator 52, a second through hole 76b is formed inside the second seal member 68a. The second through hole 76b connects the first flow field 62 and the second flow field 64.

Figure 7:
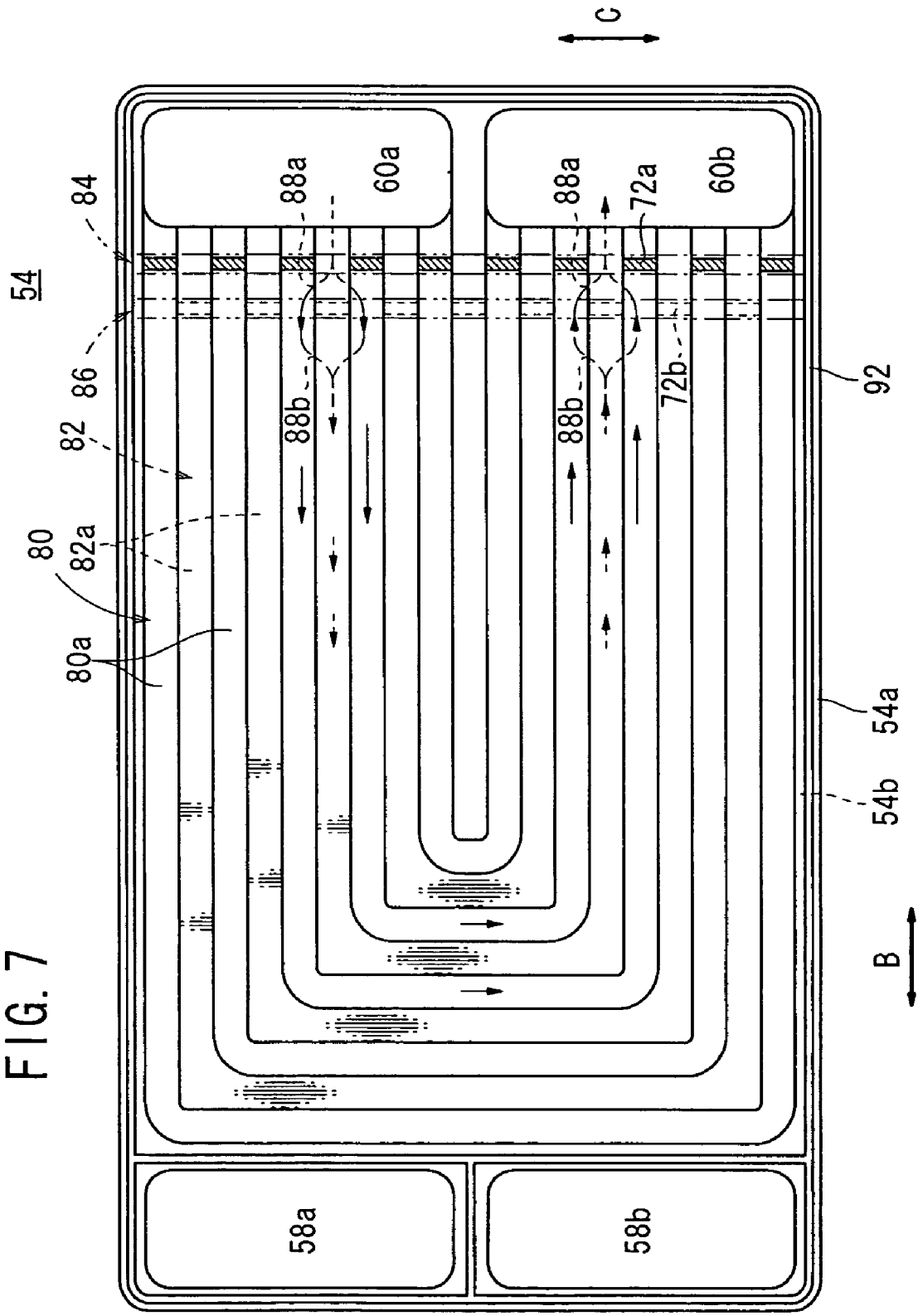
FIG. 7 is a front view showing a second separator of the humidification apparatus.

As shown in FIGS. 4 and 7, the second separator 54 has a third flow field 80 on a third surface 54a facing the other surface 50b of the water permeable membrane 50. The third flow field 80 includes a plurality of grooves (second flow grooves) 80a curved in a substantially U-shape on the third surface 54a. The grooves 80a of the third flow field 80 are connected between the off gas supply passage 60a and the off gas discharge passage 60b.

Further, the second separator 54 has a fourth flow field 82 on a fourth surface 54b opposite to the third surface 54a. The fourth flow field 82 includes a plurality of grooves 82a curved in a substantially U-shape on the fourth surface 54b. The grooves 82a of the fourth flow field 62 are connected between the off gas supply passage 60a and the off gas discharge passage 60b. The grooves 82a of the fourth flow field 82 and the grooves 80a of the third flow field 80 are formed alternately.

A third seal member (seal) 84 for closing the third flow field 80 extends from a position near the inlet of the third flow field 80 to the outlet of the third flow field 80 in the direction indicated by the arrow C. Further, a fourth seal member 86 for closing the fourth flow field 82 extends from a position near the inlet of the fourth flow field 82 to the outlet of the fourth flow field 82 in the direction indicated by the arrow C. The fourth seal member 86 is offset from the third seal member 84 in the direction indicated by the arrow B. Alternatively, the third seal member 84 and the fourth seal member 86 may be provided at the same position on both surfaces of the second separator 54.

The structures of the third and fourth seal members 84, 86 are same as the structures of the first and second seal members 66, 68. Thus, the constituent elements of the third and fourth seal members 84, 86 that are identical to those of the first and second seal members 66, 68 are labeled with the same reference numeral, and detailed description thereof will be omitted.

As shown in FIG. 7, in the second separator 54, a partition wall dividing the third flow field 80 and the fourth flow field 82 has a third through hole 88a. The third through hole 88a is positioned between the third seal member 84 and the fourth seal member 86, and connects the third flow field 80 and the fourth flow field 82. Further, in the second separator 54, a fourth through hole 88b is formed inside the fourth seal member 86. The fourth through hole 88b connects the third flow field 80 and the fourth flow field 82.

As shown in FIG. 4, when the first separator 52 and the second separator 54 are stacked together such that the water permeable membrane 50 is interposed between the first separator 52 and the second separator 54, positions of the expansions 72a of the first seal member 66 correspond to positions of protrusions between the grooves 80a of the third flow field 80, and positions of the expansions 72a of the third seal member 84 correspond to positions of protrusions between the grooves 62a of the first flow field 62.

A seal 90 is formed integrally on the first separator 52. The seal 90 covers the outer marginal region of the first separator 52, and allows the air to flow between the air supply passage 58a, the air discharge passage 58b, and the first and second flow fields 62, 64 on the first and second surfaces 52a, 52b, while preventing the flow of the off gas between the first and second flow fields 62, 64 and the off gas supply passage 60a and the off gas discharge passage 60b.

A seal 92 is formed integrally on the second separator 54. The seal 92 covers the outer marginal region of the second separator 54, and allows the off gas to flow between the off gas supply passage 60a, the off gas discharge passage 60b, and the third and fourth flow fields 80, 82 on the third and fourth surfaces 54a, 54b, while preventing the flow of the air between the third and fourth flow fields 80, 82 and the air supply passage 58a and the air discharge passage 58b.

Operation of the fuel cell system 12 including the humidification apparatus 10 will be described below.

In FIG. 1, the pressure of a hydrogen gas supplied from the hydrogen tank 34 to the hydrogen supply channel 30 is reduced to a predetermined pressure by the regulator 36. The hydrogen gas is supplied to the hydrogen supply port 26a of the fuel cell stack 14 through the ejector 38. The hydrogen gas supplied to the hydrogen supply port 26a moves along the anode 20b in each of the power generation cells 16. The exhaust gas containing the unconsumed hydrogen gas is discharged to the hydrogen circulation channel 32 from the hydrogen discharge port 26b. The exhaust gas flows back to the intermediate position of the hydrogen supply channel 30 by the sucking action of the ejector 38, and is supplied again into the fuel cell stack 14 as the hydrogen fuel gas.

The air is supplied to the air supply channel 40 by the supercharger 44. The air is supplied from the end plate 57b of the humidification apparatus 10 to the air supply passage 58a of the stack body 56.

Figure 8:
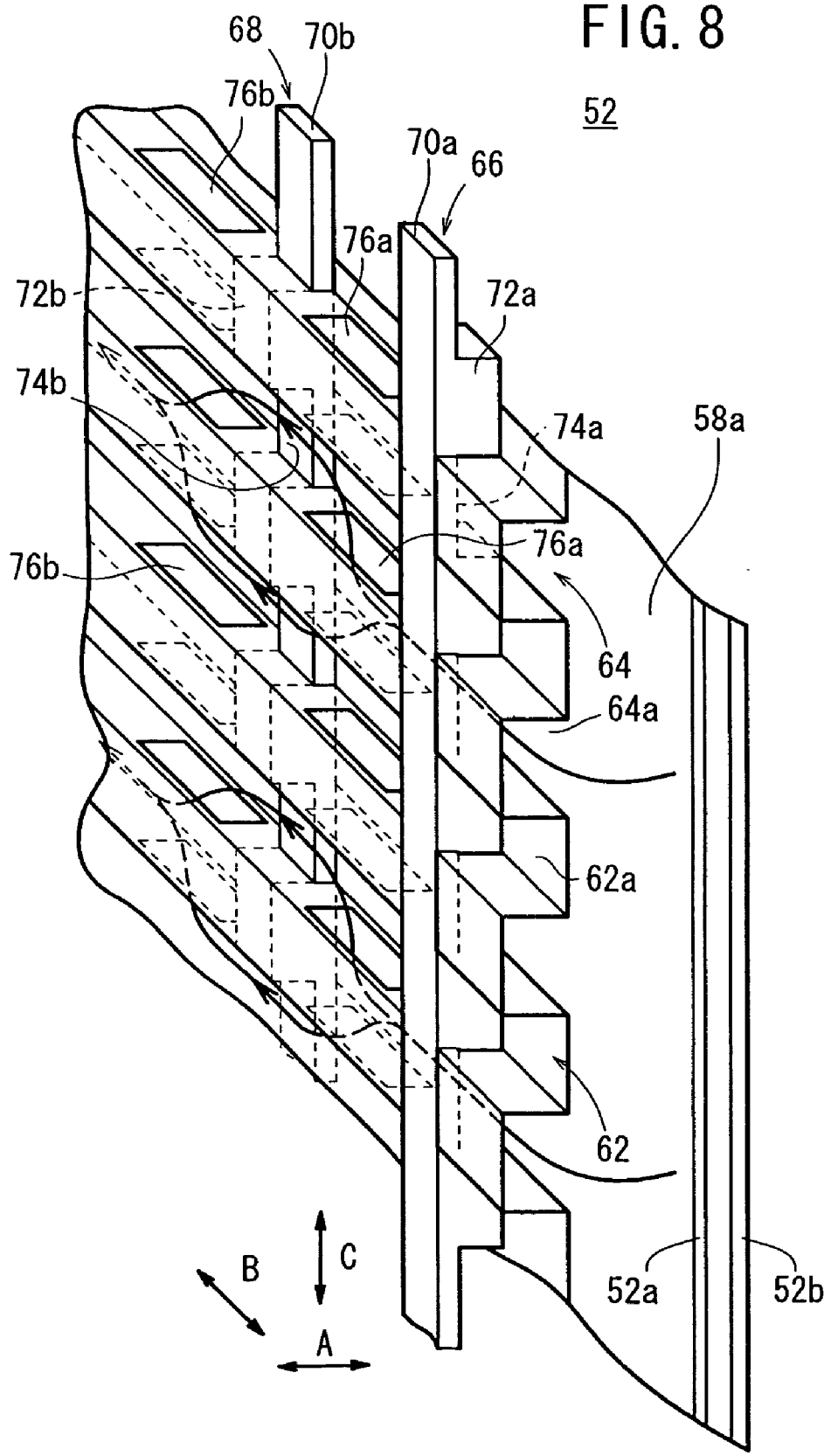
FIG. 8 is a view showing a state in which the air flows along both surfaces of the first separator.

As shown in FIGS. 5 and 8, in the first separator 52, the inlet ends of the first flow field 62 and the second flow field 64 are opened to the air supply passage 58a, and an area near the inlet of the first flow field 62 is closed by the first seal member 66. The air supplied to the air supply passage 58a flows into the grooves 64a of the second flow field 64. The forward movement of the air is prevented by the expansions 72b of the second seal member 68. Thus, the air moves to the grooves 62a of the first flow field 62 through the first through hole 76a.

The air moves along the grooves 62a, and some of the air separately flows into the grooves 64a of the second flow field 64 through the second through hole 76. That is, the air separately flows along both of the grooves 62a, 64a.

Thus, the air before reaction flows along the U-shaped grooves 62a, 64a of the first flow field 62 and the second flow field 64. The air flowing through the first flow field 62 contacts one surface 50a of the water permeable membrane 50. The air flowing through the second flow field 64 contacts the other surface 50b of another water permeable membrane 50 (see FIG. 3).

Further, in the humidification apparatus 10, the off gas, i.e., the air after consumption in the reaction for power generation in the fuel cell stack 14 is supplied to the off gas supply passage 60a. The off gas flows into the third flow field 80 and the fourth flow field 82 of the second separator 54 through the off gas supply passage 60a.

As shown in FIGS. 4 and 7, the third and fourth seal members 84, 86 are provided in the third and fourth flow fields 80, 82. As with the case of the first separator 52, firstly, the off gas temporarily flows into the grooves 82a of the fourth flow field 82. Then, the off gas flows into the grooves 80a of the third flow field 80 through the third through hole 88a. Further, the off gas flows through the fourth through hole 88b, and some of the off gas flows along the grooves 82a. That is, the off gas separately flows along the U-shaped grooves 80a, 82a of the third and fourth flow fields 80, 82.

Thus, the off gas flowing through the third flow field 80 contacts the other surface 50b of the water permeable membrane 50, and the off gas flowing through the fourth flow field 82 contacts one surface 50a of still another water preamble membrane 50 (see FIG. 3).

Accordingly, the water in the off gas moving along the third flow field 80 of the second separator 54 passes through the water permeable membrane 50, and the water is supplied to the air flowing along the first flow field 62 before reaction. Thus, the air is humidified. Further, the air flowing along the second flow field 64 before reaction is humidified by the off gas moving along the fourth flow field 82. The humidified air is supplied from the air discharge passage 58b to the air supply port 28a of the fuel cell stack 14.

As shown in FIG. 1, the humidified air is supplied to the cathode 20c in each of the power generation cells 16. As described above, the off gas containing the unconsumed air is discharged from the air discharge port 28b to the air humidification apparatus 10. Thus, in each of the power generation cells 16, the hydrogen supplied to the anode 20b and the oxygen in the air supplied to the cathode 20c are consumed in the reactions for generating electricity.

In the first embodiment, as shown in FIGS. 3 and 4, the first flow field 62 is formed on the first surface 52a of the first separator 52, and the second flow field 64 is formed on the second surface 52b of the first separator 52. The first and second flow fields 62, 64 are connected to the air supply passage 58a and the air discharge passage 58b, and the same reactant gas (air) is supplied to the first and second flow fields 62, 64.

The third flow field 80 is formed on the third surface 54a of the second separator 54, and the fourth flow field 82 is formed on the fourth surface 54b of the second separator 54. The third and fourth flow fields 80, 82 are connected to the off gas supply passage 60a and the off gas discharge passage 60b. The same humidifying fluid (off gas) is supplied to the third and fourth flow fields 80, 82.

Therefore, the air flowing along the first flow field 62 of the first separator 52 is humidified by the off gas flowing along the third flow field 80 of the second separator 54. The air flowing along the second flow field 64 is humidified by the off gas flowing along the fourth flow field 82. Thus, the air supplied to the first separator 52 flows separately through the first and second flow fields 62, 64, and the air is humidified through the water permeable membranes 50 on both sides. The humidification efficiency of the air is improved effectively.

Accordingly, it is possible to reduce the overall size of the humidification apparatus 10, and efficiently and reliably humidify the air before reaction. Thus, improvement in the power generation efficiency of the fuel cell stack 14 is achieved.

Further, in the first embodiment, the first seal member 66 is provided on the first separator 52. The first seal member 66 closes the areas near the inlet and the outlet of the first flow field 62. Further, the second seal member 68 is provided on the first separator 52. The second seal member 68 is offset from the first seal member 66, and closes the areas near the inlet and the outlet of the second flow field 64.

As shown in FIG. 8, the air supplied to the air supply passage 58*a* temporarily flows into the grooves 64*a* of the second flow field 64, and flows toward the first flow field 62 through the first through hole 76*a*. Then, some of the air flows separately toward the second flow field 64 through the second through hole 76*b*. Thus, in the first and second flow fields 62, 64, the pressure drop area is generated at the inlet of the air. Accordingly, the air flows smoothly and reliably into the respective grooves 62*a*, 64*a*.

Further, the plate section 70*a* of the first seal member 66 contacts the water permeable membrane 50 to maintain the contact pressure with the water permeable membrane 50. Therefore, the water permeable membrane 50 does not enter the grooves 62*a*. Thus, it is possible to prevent the cross leakage between the air before reaction and the off gas.

Further, in the grooves 62*a*, 64*a*, by changing the depth of the recesses 74*a*, 74*b* and the opening area of the first and second through holes 76*a*, 76*b*, it is possible to change the flow distribution of the air supplied to the grooves 62*a*, 64*a*. Thus, the desired flow distribution is achieved advantageously. Further, the grooves 62*a*, 62*b* are directly opened to the air supply passage 58*a* and the air discharge passage 58*b*. Thus, as shown in FIG. 5, the corrugated portion is present at the air supply passage 58*a*. With the corrugated portion having the rib structure, improvement in the strength is achieved. Further, in the second separator 54, the same advantages as with the first separator 52 can be obtained.

When the first and second separators 52, 54 are stacked together such that the water permeable membrane 50 is interposed between the first and second separators 52, 54, the first seal member 66 is provided at the position corresponding to the positions of the protrusions of the third flow field 80, and the third seal member 84 is provided at the position corresponding to the positions of the protrusions of the first flow field 62. Thus, the contact pressure with the water permeable membrane 50 is maintained, and the cross leakage is prevented as much as possible.

In the first embodiment, the air as one of the reactant gases is humidified, and supplied to the fuel cell stack 14. However, the present invention is not limited in this respect. Alternatively, the fuel gas as the other reactant gas may be humidified. Further, in the first embodiment, as the humidifying fluid, the off gas, i.e., the air discharged from the fuel cell stack 14 is used. However, the present invention is not limited in this respect. Other humidifying gases such as a dedicated vapor gas or pure water, or liquid may be used for humidification.

Further, in the first embodiment, the air supply passage 58*a* is positioned above the air discharge passage 58*b*, and the off gas supply passage 60*a* is positioned above the off gas discharge passage 60*b*. Conversely, the air supply passage 58*a* may be positioned under the air discharge passage 58*b*, and the off gas supply passage 60*a* may be positioned under the off gas discharge passage 60*b*.

Figure 9:
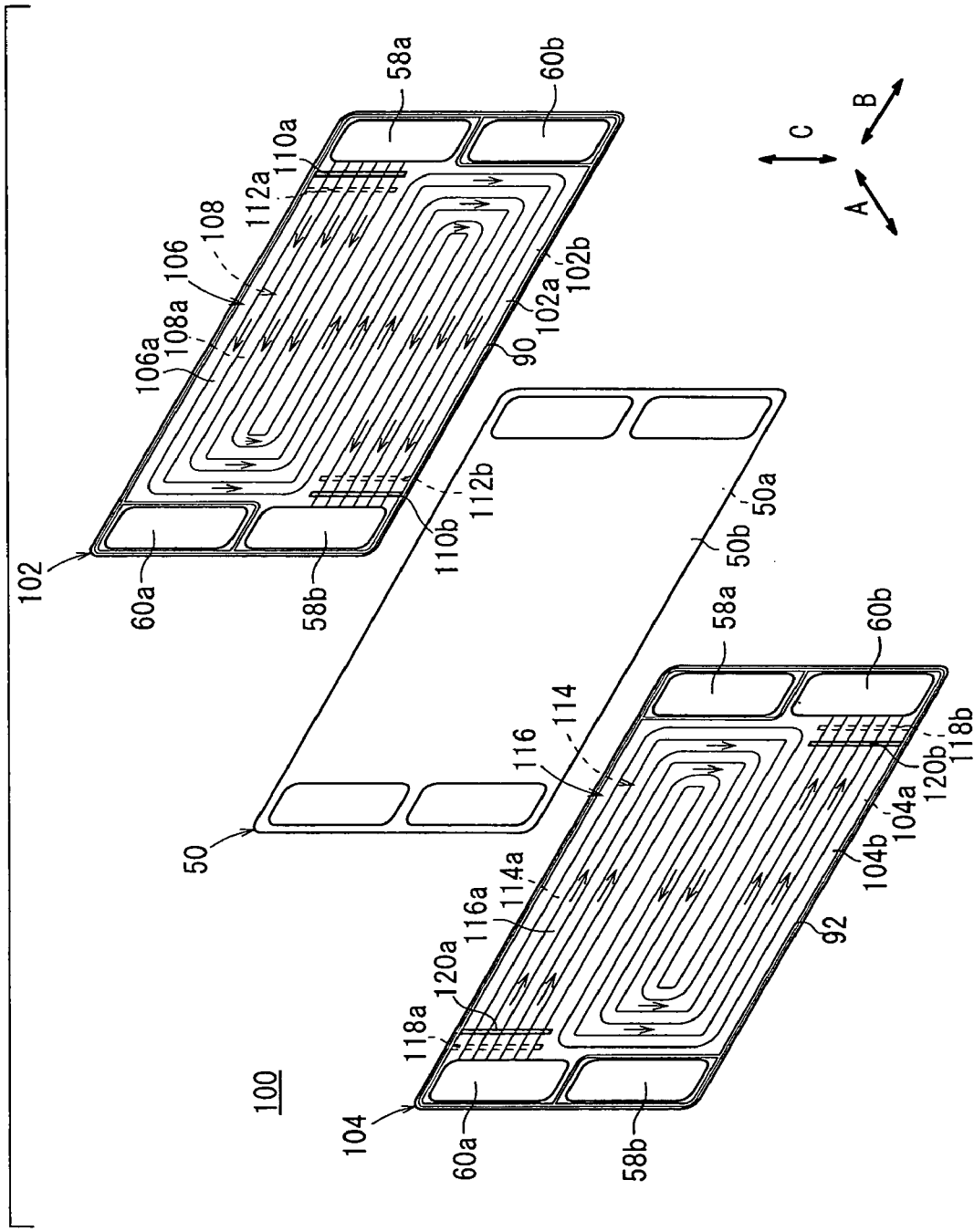
FIG. 9 is an exploded perspective view showing main components of a humidification apparatus according to a second embodiment of the present invention.

FIG. 9 is an exploded perspective view showing main components of a humidification apparatus 100 according to a second embodiment of the present invention. In FIG. 9, the constituent elements that are identical to those of the humidification apparatus 10 according to the first embodiment are labeled with the same reference numeral, and description thereof will be omitted. Further, in third through ninth embodiments as described later, the constituent elements that are identical to those of the humidification apparatus 10 according to the first embodiment are labeled with the same reference numeral, and description thereof will be omitted.

The humidification apparatus 100 includes a first separator 102 and a second separator 104 which are provided alternately on one surface 50*a* of the water permeable membrane 50 and the other surface 50*b* of the water permeable membrane 50. In the humidification apparatus 100, the air supply passage 58*a* and the air discharge passage 58*b* are provided at corners on one diagonal line, and the off gas supply passage 60*a* and the off gas discharge passage 60*b* are provided at corners on the other diagonal line.

The first separator 102 has a first flow field 106 on a first surface 102*a* facing one surface 50*a* of the water permeable membrane 50. The first flow field 106 includes a plurality of grooves 106*a* in a serpentine pattern having two turn regions and three straight regions for allowing the air to flow back and forth in the direction indicated by the arrow B. The serpentine grooves 106*a* of the first flow field 106 are connected between the air supply passage 58*a* and the air discharge passage 58*b*. Further, the first separator 102 has a second flow field 108 on a second surface 102*b* opposite to the first surface 102*a*. The second flow field 108 includes a plurality of grooves 108*a* in a serpentine pattern having two turn regions and three straight regions. The serpentine grooves 108*a* of the second flow field 108 are connected between the air supply passage 58*a* and the air discharge passage 58*b*. By adopting the grooves 106*a*, 108*a* in the serpentine pattern, it is possible to increase the length of the grooves 106*a*, 108*a*, and increase the amount of water used for humidification.

The grooves 106*a* of the first flow field 106 and the grooves 108*a* of the second flow field 108 are formed alternately, and opposite ends of the grooves 106*a*, 108*a* are directly opened to the air supply passage 58*a* and the air discharge passage 58*b*.

In the first flow field 106, first seal members 110*a*, 110*b* are provided near the air supply passage 58*a* and the air discharge passage 58*b*. In the second flow field 108, second seal members 112*a*, 112*b* are provided. The second seal members 112*a*, 112*b* are offset inwardly from the first seal members 110*a*, 110*b*.

The second separator 104 has a third flow field 114 on a third surface 104*a* facing the other surface 50*b* of the water permeable membrane 50. The third flow field 114 includes a plurality of grooves 114*a* in a serpentine pattern having two turn regions and three straight regions for allowing the off gas to flow back and forth in the direction indicated by the arrow B. The serpentine grooves 114*a* of the third flow field 114 are connected between the off gas supply passage 60*a* and the off gas discharge passage 60*b*. Further, the second separator 104 has a fourth flow field 116 on a fourth surface 104*b* opposite to the third surface 104*a*. The fourth flow field 116 includes a plurality of grooves 116*a* in a serpentine pattern. The serpentine grooves 116*a* of the fourth flow field 116 are connected between the off gas supply passage 60*a* and the off gas discharge passage 60*b*.

The grooves 114*a* of the third flow field 114 and the grooves 116*a* of the fourth flow field 116 are formed alternately. In the third flow field 114, third seal members 118*a*, 118*b* are provided near the off gas supply passage 60*a* and the off gas discharge passage 60*b*. In the fourth flow field 116, fourth seal members 120*a*, 120*b* are provided. The fourth seal members 120*a*, 120*b* are offset inwardly from the third seal members 118*a*, 118*b*.

Figure 10:
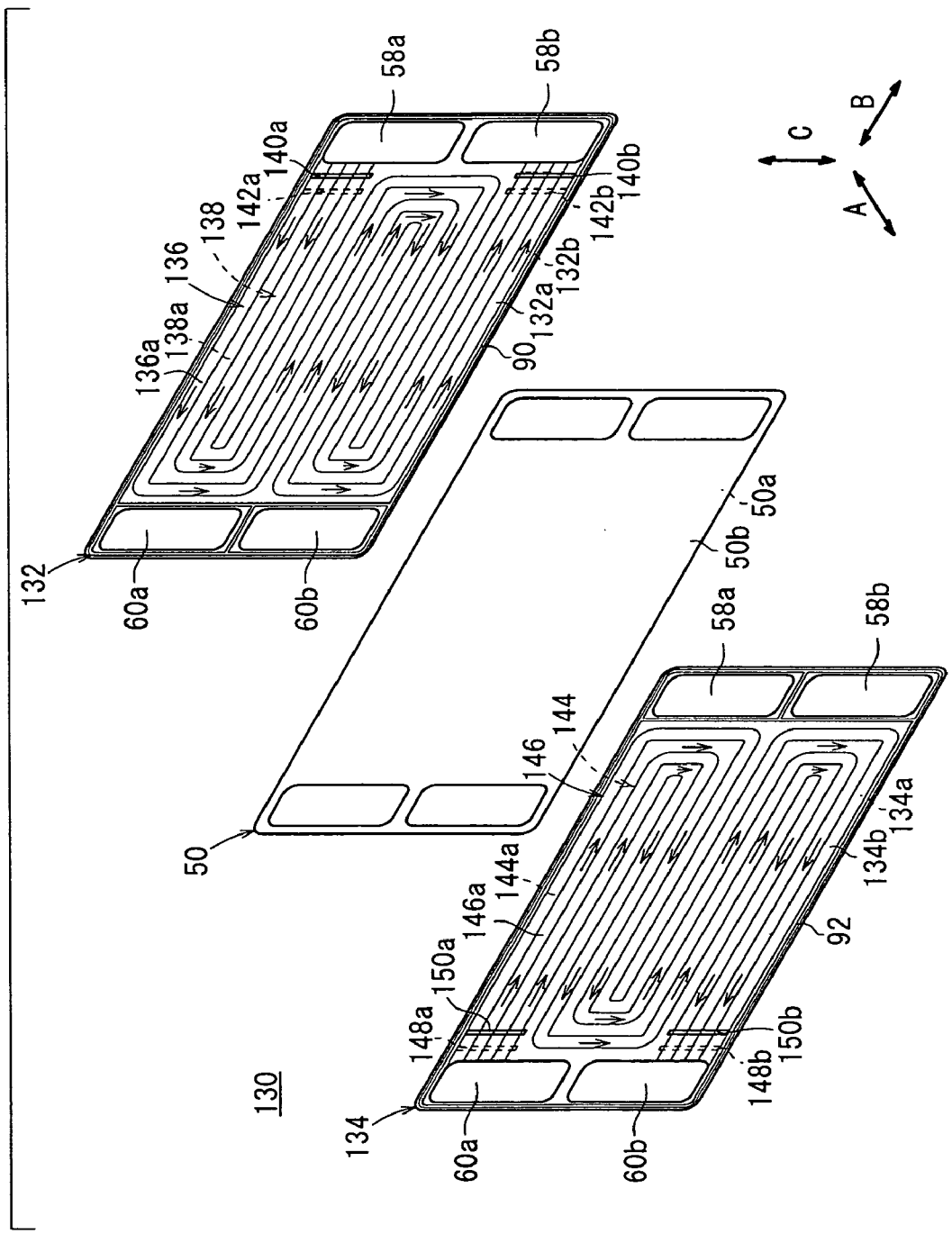
FIG. 10 is an exploded perspective view showing main components of a humidification apparatus according to a third embodiment of the present invention.

FIG. 10 is an exploded perspective view showing main components of a humidification apparatus 130 according to a third embodiment of the present invention.

The humidification apparatus 130 includes a first separator 132 and a second separator 134 which are provided alternately on one surface 50a of the water permeable membrane 50 and the other surface 50b of the water permeable membrane 50.

The first separator 132 has a first flow field 136 on a first surface 132a facing one surface 50a of the water permeable membrane 50. The first flow field 136 includes a plurality of grooves 136a in a serpentine pattern having three turn regions and four straight regions for allowing the air to flow back and forth indicated by the arrow B. The serpentine grooves 136a of the first flow field 136 are connected between the air supply passage 58a and the air discharge passage 58b. Further, the first separator 132 has a second flow field 138 on a second surface 132b opposite to the first surface 132a. The second flow field 138 includes a plurality of grooves 138a in a serpentine pattern. The serpentine grooves 138a of the second flow field 138 are connected between the air supply passage 58a and the air discharge passage 58b.

First seal members 140a, 140b are provided near the inlet and the outlet of the first flow field 136. Further, second seal members 142a, 142b are provided near the inlet and the outlet of the second flow filed 138. The second seal members 142a, 142b are offset inwardly from the first seal members 140a, 140b.

The second separator 134 has a third flow field 144 on a third surface 134a. The third flow field 144 includes a plurality of grooves 144a in a serpentine pattern having three turn regions and four straight regions for allowing the off gas to flow back and forth indicated by the arrow B. The serpentine grooves 144a of the third flow field 144 are connected between the off gas supply passage 60a and the off gas discharge passage 60b. Further, the second separator 134 has a fourth flow field 146 on a fourth surface 134b opposite to the third surface 134a. The fourth flow field 146 includes a plurality of grooves 146a in a serpentine pattern. The serpentine grooves 146a of the fourth flow field 146 are connected between the off gas supply passage 60a and the off gas discharge passage 60b.

Third seal members 148a, 148b are provided near the inlet and the outlet of the third flow field 144. Further, fourth seal members 150a, 150b are provided near the inlet and the outlet of the fourth flow field 146. The fourth seal members 150a, 150b are offset inwardly from the third seal members 148a, 148b.

Figure 11:
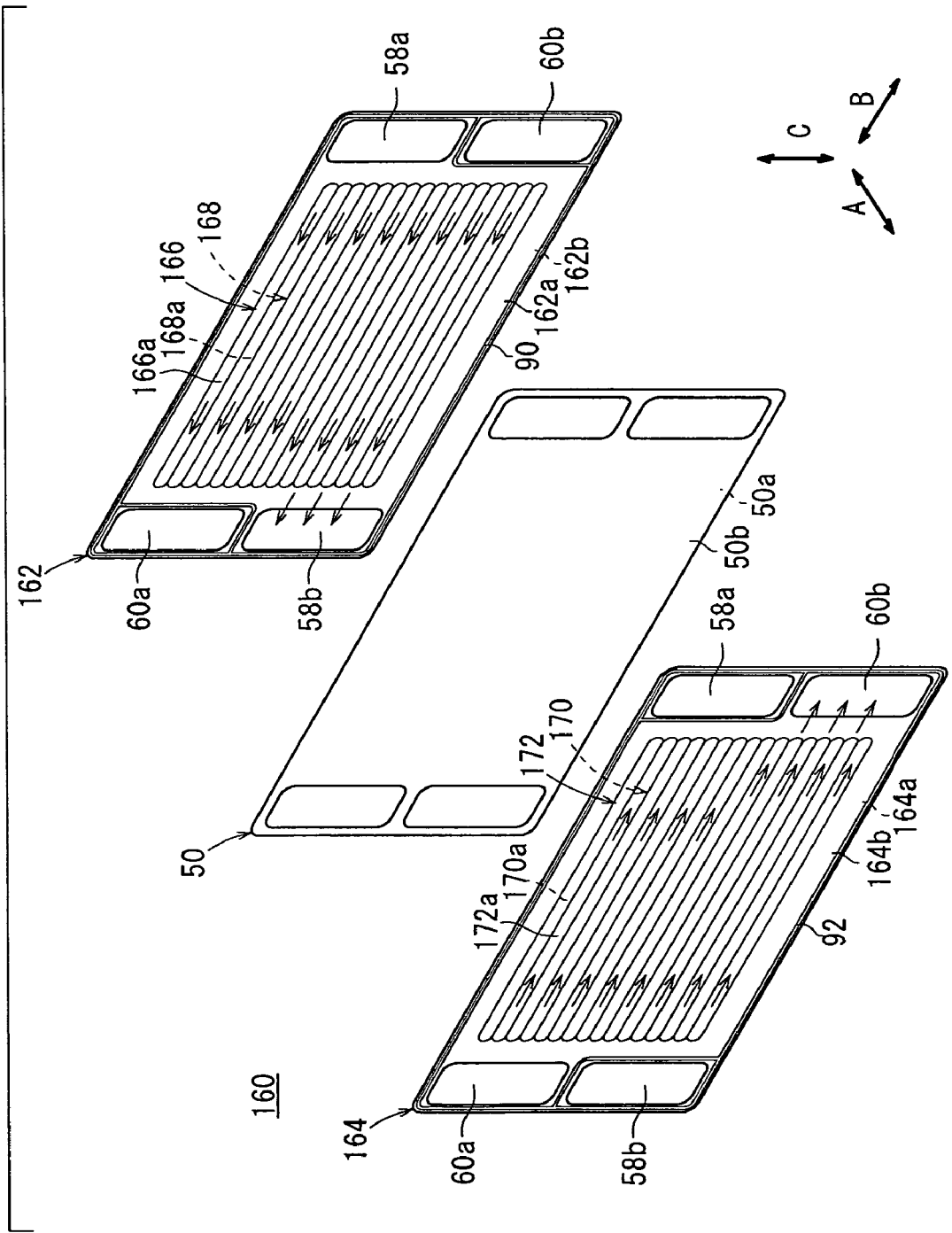
FIG. 11 is an exploded perspective view showing main components of a humidification apparatus according to a fourth embodiment of the present invention.

FIG. 11 is an exploded perspective view showing main components of a humidification apparatus 160 according to a fourth embodiment of the present invention.

The humidification apparatus 160 includes a first separator 162 and a second separator 164 which are provided alternately on one surface 50a of the water permeable membrane 50 and the other surface 50b of the water permeable membrane 50.

The first separator 162 has a first flow field 166 on a first surface 162a and a second flow field 168 on a second surface 162b. The first flow field 166 includes a plurality of straight grooves 166a extending in the direction indicated by the arrow B. The straight grooves 166a are connected between the air supply passage 58a and the air discharge passage 58b. The second flow field 168 includes a plurality of straight grooves 168a extending in the direction indicated by the arrow B. The straight grooves 168a are connected between the air supply passage 58a and the air discharge passage 58b. The grooves 166a and the grooves 168a are formed alternately.

The second separator 164 has a third flow field 170 on a third surface 164a and a fourth flow field 172 on a fourth surface 164b. The third flow field 170 includes a plurality of straight grooves 170a extending in the direction indicated by the arrow B. The straight grooves 170a are connected between the off gas supply passage 60a and the off gas discharge passage 60b. The fourth flow field 172 includes a plurality of straight grooves 172a extending in the direction indicated by the arrow B. The straight grooves 172a are connected between the off gas supply passage 60a and the off gas discharge passage 60b. The grooves 170a and the straight grooves 172a are formed alternately.

Figure 12:
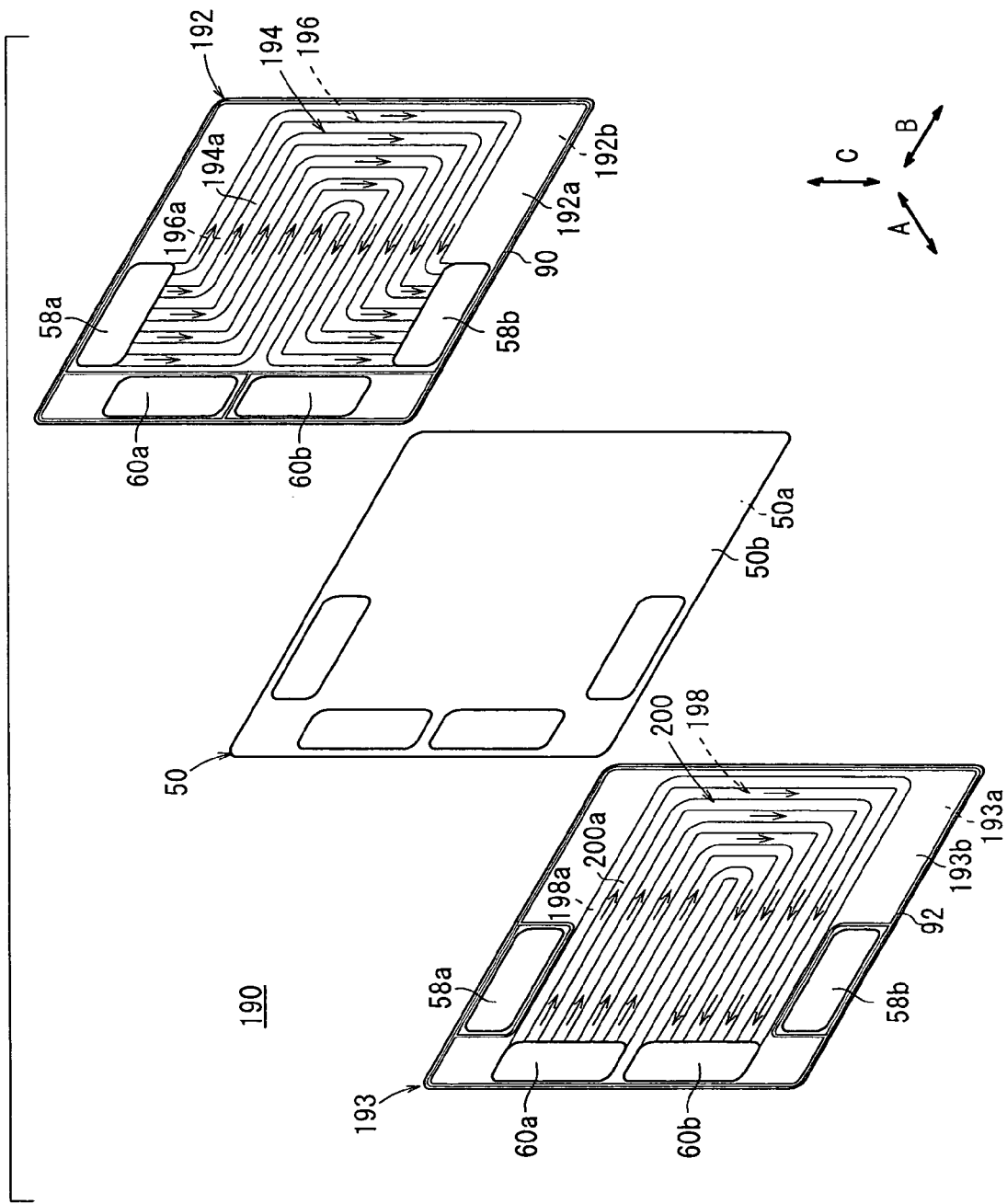
FIG. 12 is an exploded perspective view showing main components of a humidification apparatus according to a fifth embodiment of the present invention.

FIG. 12 is an exploded perspective showing main components of a humidification apparatus 190 according to a fifth embodiment of the present invention.

The humidification apparatus 190 includes a first separator 192 and a second separator 193 which are provided alternately on one surface 50a of the water permeable membrane 50 and the other surface 50b of the water permeable membrane 50. At one end of the humidification apparatus 190 in the direction indicated by the arrow B, the off gas supply passage 60a and the off gas discharge passage 60b are provided. Further, in upper and lower portions at the one end of the humidification apparatus 190, the air supply passage 58a and the air discharge passage 58b are provided.

The first separator 192 has a first flow field 194 on a first surface 192a and a second flow field 196 on a second surface 192b. The first flow field 194 includes a plurality of grooves 194a curved in a U-shape. The curved grooves 194a of the first flow field 194 are connected between the air supply passage 58a and the air discharge passage 58b. The second flow field 196 includes a plurality of grooves 196a curved in a U-shape. The curved grooves 196a are connected between the air supply passage 58a and the air discharge passage 58b. The grooves 194a of the first flow field 194 and the grooves 196a of the second flow field 196 are formed alternately.

The second separator 193 has a third flow field 198 on a third surface 193a and a fourth flow field 200 on a fourth surface 193b. The third flow field 198 includes a plurality of grooves 198a curved in a substantially U-shape, and connected between the off gas supply passage 60a and the off gas discharge passage 60b. The fourth flow field 200 includes a plurality of grooves 200a curved in a substantially U-shape, and connected between the off gas supply passage 60a and the off gas discharge passage 60b. The grooves 198a and the grooves 200a are formed alternately.

Alternatively, the positions of the air discharge passage 58b and the off gas discharge passage 60b may be switched, or the positions of the air supply passage 58a and the off gas supply passage 60a may be switched. In this case, in the first through fourth flow fields 194 through 200, the grooves are straight at one end, and the grooves are curved at the other end.

In the second through fifth embodiments, the same advantages as with the humidification apparatus 10 according to the first embodiment can be obtained.

Figure 13:
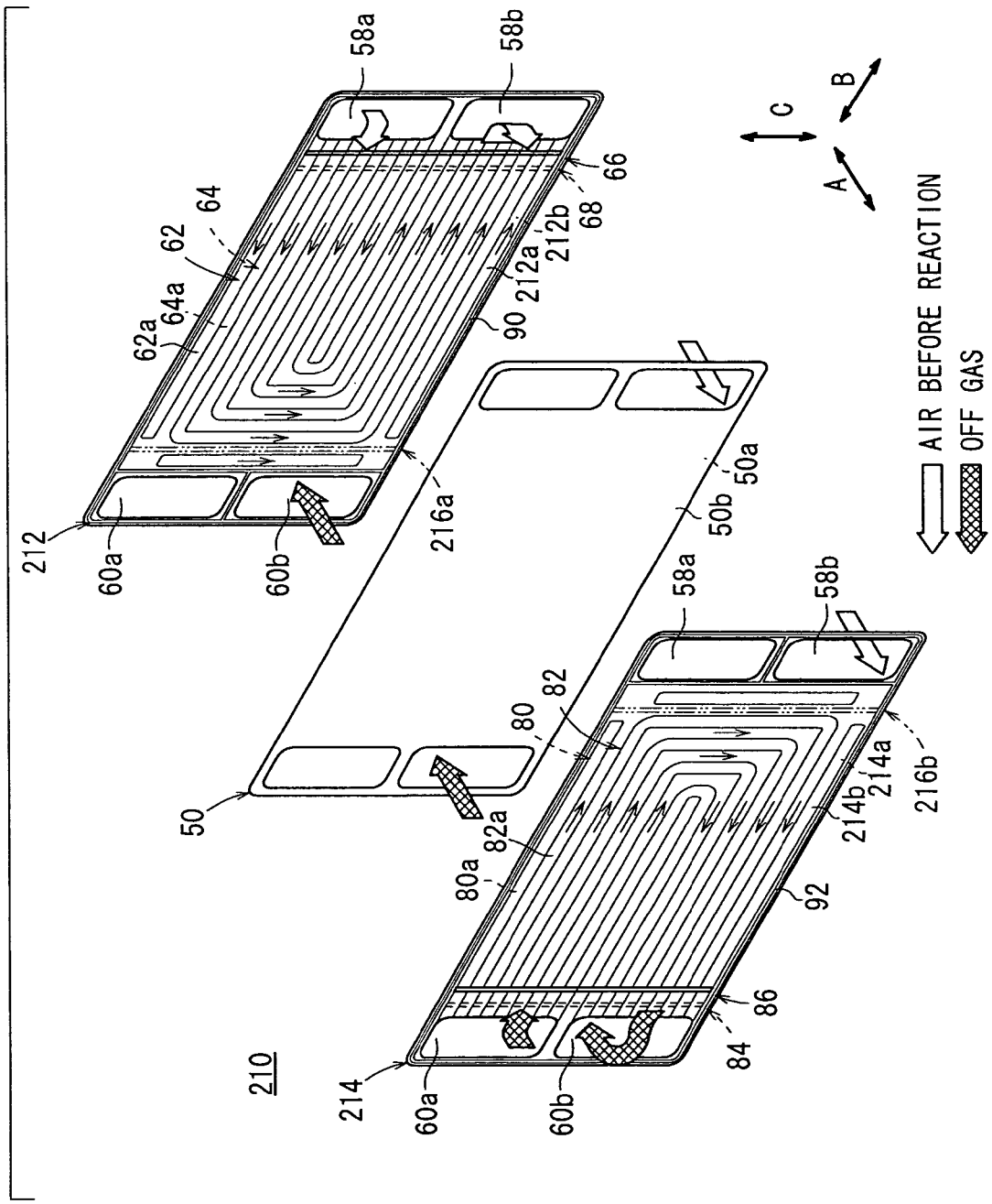
FIG. 13 is an exploded perspective view showing main components of a humidification apparatus according to a sixth embodiment of the present invention.

FIG. 13 is an exploded perspective view showing main components of a humidification apparatus 210 according to a sixth embodiment of the present invention.

The humidification apparatus 210 includes a first separator 212 and a second separator 214 which are provided alternately on one surface 50a of the water permeable membrane 50 and the other surface 50b of the water permeable membrane 50.

Figure 14:
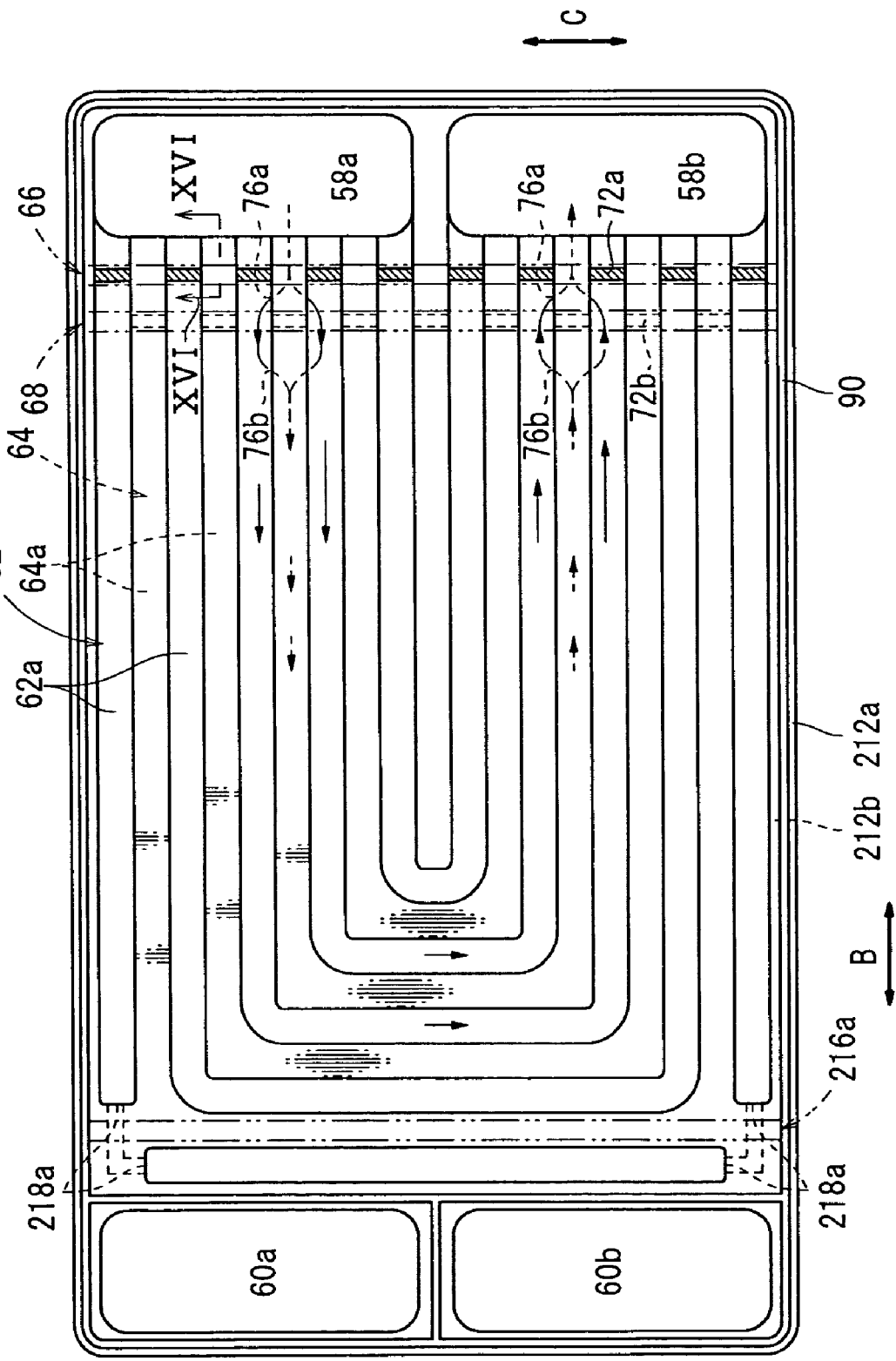
FIG. 14 is a front view showing a first separator of the humidification apparatus.

As shown in FIGS. 13 and 14, when the first separator 212 and the second separator 214 are stacked together such that the water permeable membrane 50 is interposed between the first separator 212 and the second separator 214, a first straight ridge 216a is formed on the first surface 212a of the first separator 212. The first straight ridge 216a is overlapped with a third seal member 84 of the second separator 214 in the stacking direction. The first straight ridge 216a is provided between grooves 62a, and extends in the direction indicated by the arrow C. The first straight ridge 216a closes the grooves 62a at its opposite ends in the direction indicated by the arrow C. The first straight ridge 216a has a flat upper surface extending in the direction indicated by the arrow C over the entire length of the third seal member 84.

Figure 15:
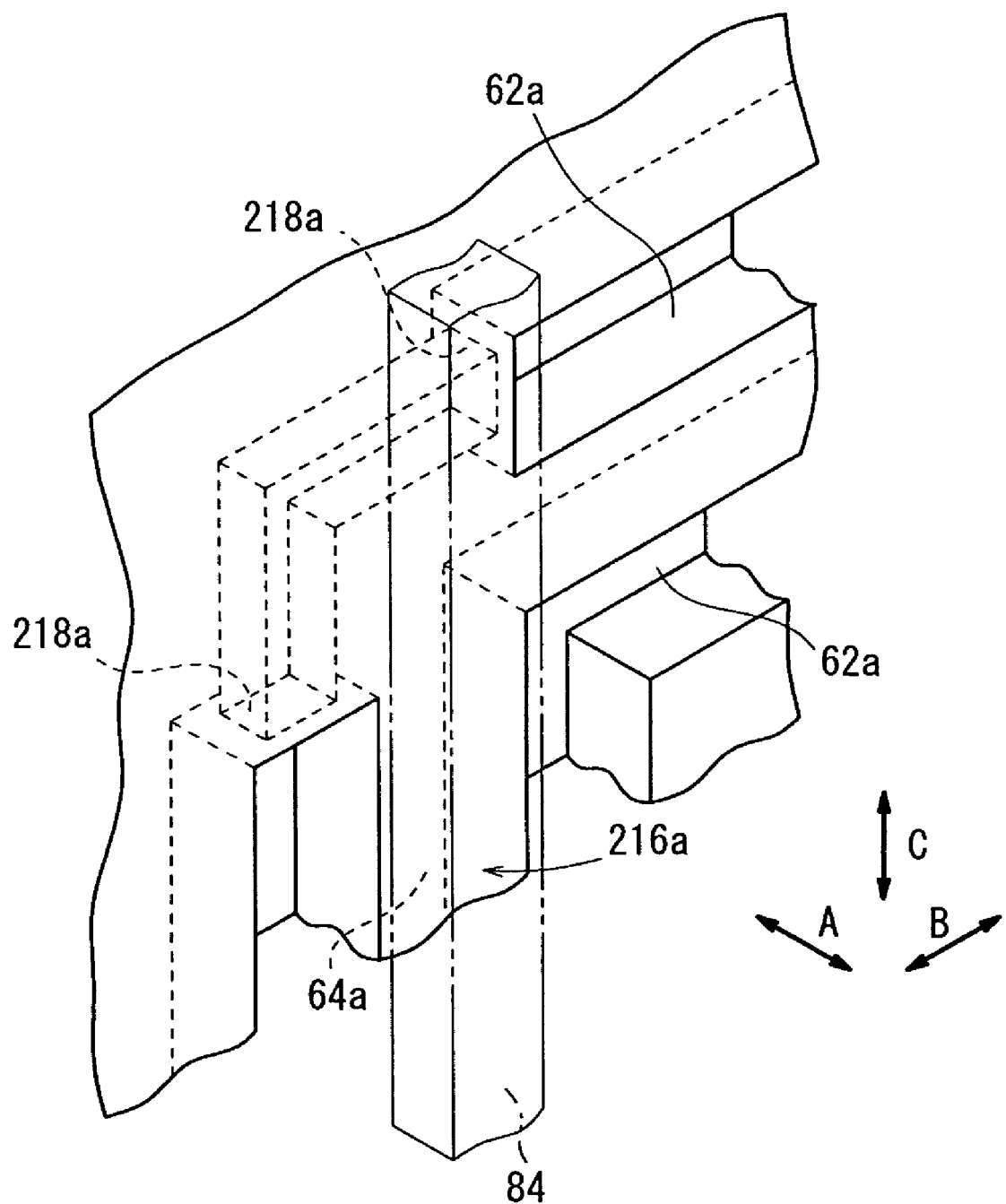
FIG. 15 is a perspective view showing part of a straight ridge.
Figure 16:
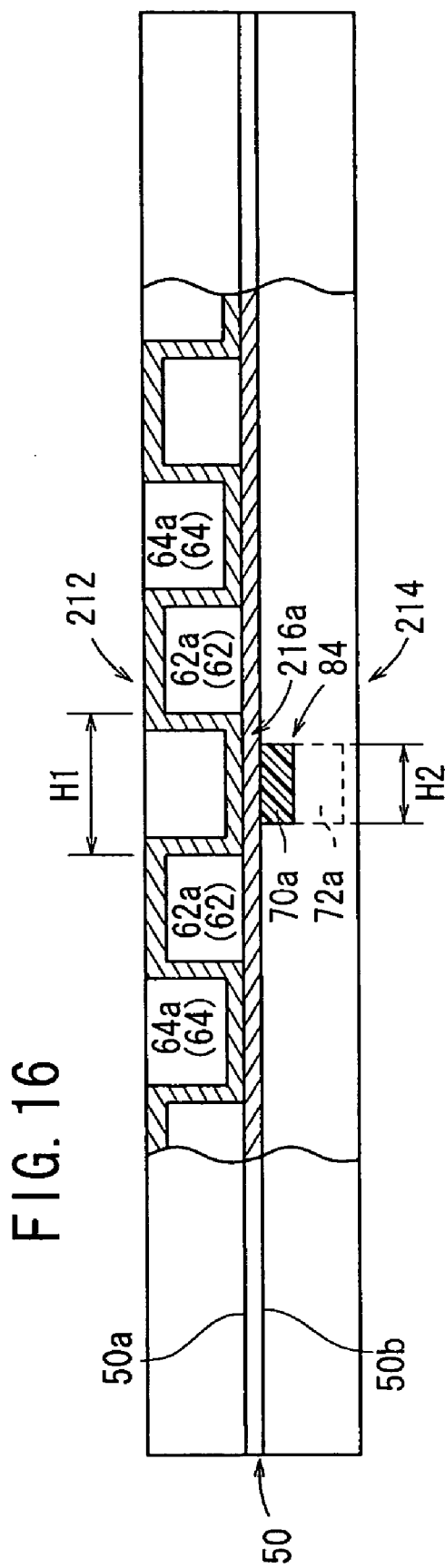
FIG. 16 is a cross sectional view taken along a line XVI-XVI-in FIG. 14.

As shown in FIG. 15, at each of the opposite ends of the first straight ridge 216a, a flow field connection opening 218a is formed for connecting the separated grooves 62a on the side of the grooves 64a. As shown in FIG. 16, the width H1 of the flat surface of the first straight ridge 216a is larger than the seal width H2 of the third seal member 84. The opposite ends of the first straight ridge 216a in the lateral direction face protrusions of the second separator 214, bridging the third seal member 84.

Figure 17:
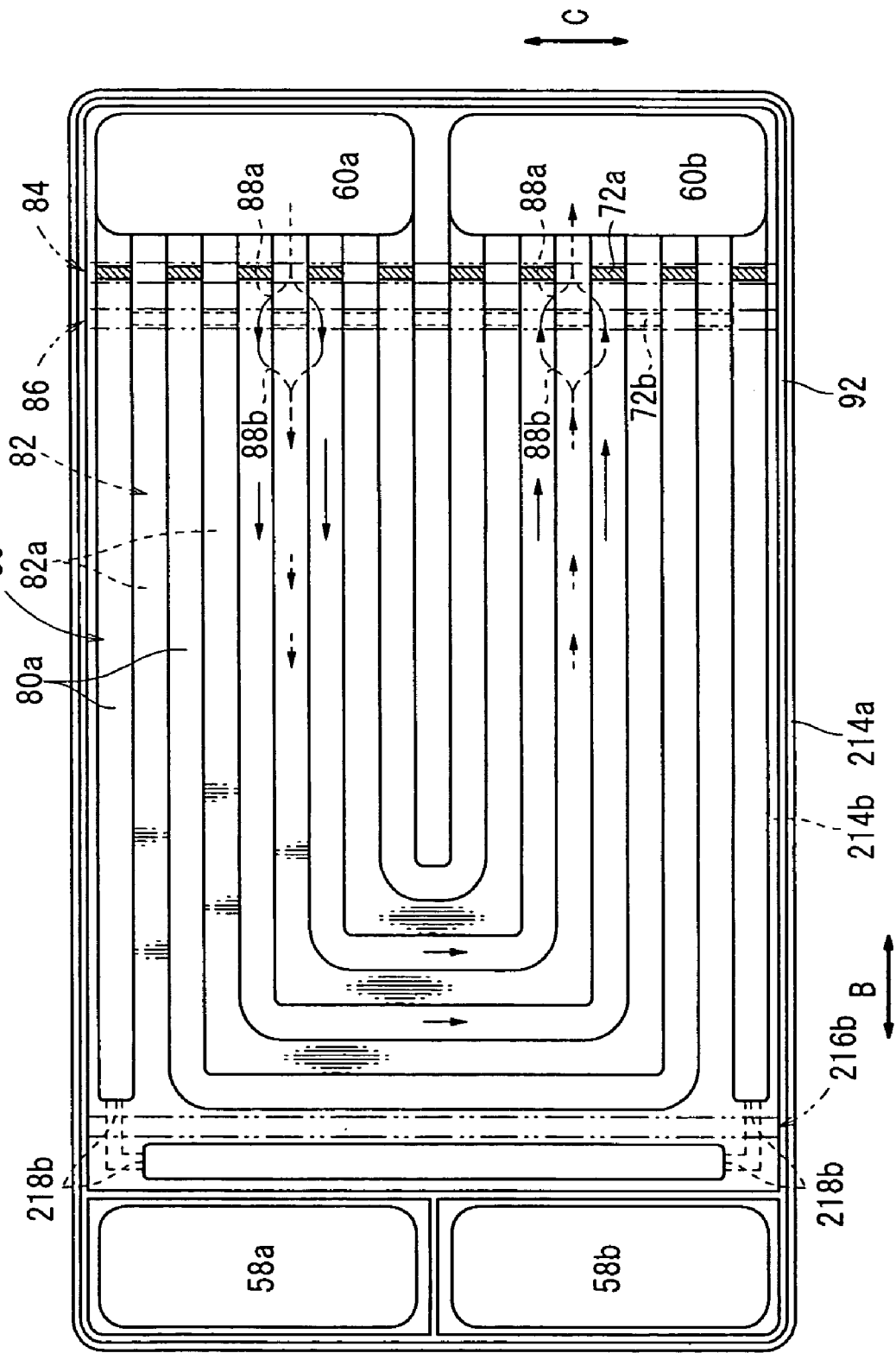
FIG. 17 is a front view showing a second separator of the humidification apparatus.

As shown in FIGS. 13 and 17, when the first and second separators 212, 214 are stacked together such that the water permeable membrane 50 is interposed between the first and second separators 212, 214, a second straight ridge 216b is formed on the third surface 54a of the second separator 214. The second straight ridge 216b is overlapped with the first seal member 66 of the first separator 212 in the stacking direction. As with the case of the first straight ridge 216a, the second straight ridge 216b extends between the grooves 80a in the direction indicated by the arrow C, and closes part of the grooves 80a at its opposite ends. The second straight ridge 216b has a flat surface extending in the direction indicated by the arrow C over the entire length of the first seal member 66. At each opposite end of the second straight ridge 216b, a flow field connection opening 218b is formed for connecting the separated grooves 80a on the side of the grooves 82a.

In the sixth embodiment, when the first separator 212 and the second separator 214 are stacked together such that the water permeable membrane 50 is interposed between the first separator 212 and the second separator 214, the first straight ridge 216a overlapped with the third seal member 84 in the stacking direction and the second straight ridge 216b overlapped with the first seal member 66 in the stacking direction are provided (see FIGS. 14 and 17).

Thus, when the first separator 212 and the second separator 214 are stacked together such that the water permeable membrane 50 is interposed between the first separator 212 and the second separator 214 to form the stack body 56, and a tightening load is applied to the stack body 56 in the stacking direction, the first seal member 66 is supported by the second straight ridge 216b, and the third seal member 84 is supported by the first straight ridge 216a. With the simple structure, the pressures applied to the surfaces of the first and third seal members 66, 84 can be maintained. It is possible to achieve improvement in the sealing performance, and maintain the sufficient rigidity in the stacking direction.

Further, as shown in FIG. 16, the width H1 of the first straight ridge 216a is larger than the seal width H2 of the third seal member 84. The opposite ends of the first straight ridge 216a in the lateral direction are overlapped with the protrusions of the second separator 214 such that the water permeable membrane 50 is interposed between the first straight ridge 216a and the second separator 214. The first and second separators 212, 214 are supported by the contact of the rigid first and second separators 212, 214. Thus, the overall rigidity of the stack body 56 in the stacking direction is improved reliably.

Further, in the sixth embodiment, the first and second straight ridges 216a, 216b have the flat surfaces extending in the direction indicated by the arrow C to cover the grooves 62a, 80a at opposite ends in the direction indicated by the arrow C. Positions of the plate sections 70a of the third seal member 84 and the first seal member 66 correspond to positions of the flat surfaces of the first and second straight ridges 216a, 216b. Thus, no step is formed in the seal surfaces of the first and third seal members 66, 84. Accordingly, for example, it is possible to suitably prevent the increase in the pressure due to the deformation (downward deformation by the weight) of the water permeable membrane 50 or the leakage due to the deformation (downward deformation by the weight) of the first and third seal members 66, 84.

Further, the first and third seal members 66, 84 are provided inside the first and third flow fields 62, 80. Thus, in the surfaces of the first and second separators 212, 214, it is possible to efficiently increase the effective surface area used for permeation of the vapor, and improvement in the vapor permeability is achieved easily.

Figure 18:
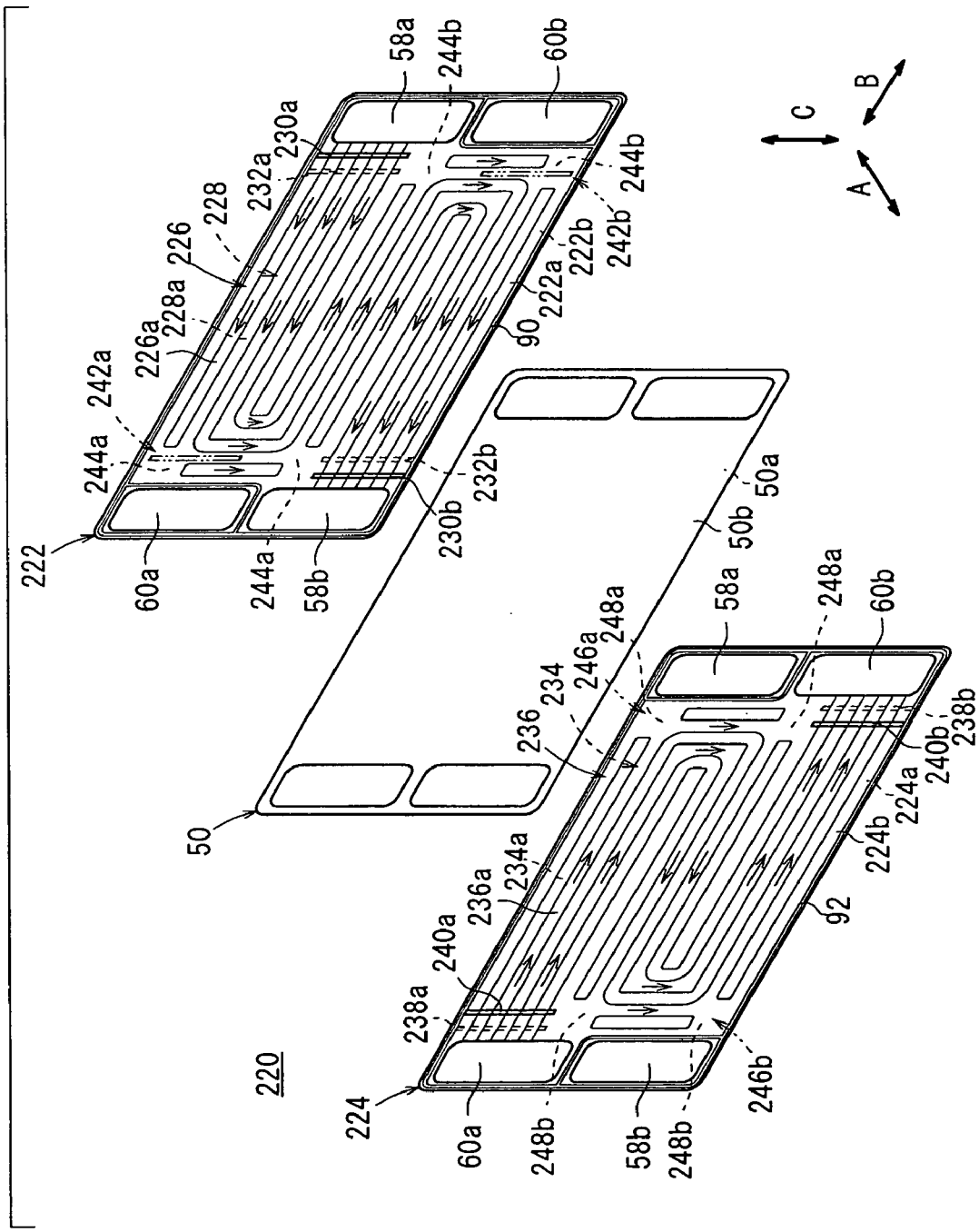
FIG. 18 is an exploded perspective view showing main components of a humidification apparatus according to a seventh embodiment of the present invention.

FIG. 18 is an exploded perspective view showing main components of a humidification apparatus 220 according to a seventh embodiment of the present invention.

The humidification apparatus 220 includes a first separator 222 and a second separator 224 which are provided alternately on one surface 50a of the water permeable membrane 50 and the other surface 50b of the water permeable membrane 50. In the humidification apparatus 220, the air supply passage 58a and the air discharge passage 58b are provided at corners on one diagonal line, and the off gas supply passage 60a and the off gas discharge passage 60b are provided at corners on the other diagonal line.

The first separator 222 has a first flow field 226 on a first surface 222a facing one surface 50a of the water permeable membrane 50. The first flow field 226 includes a plurality of grooves 226a in a serpentine pattern having two turn regions and three straight regions for allowing the air to flow back and forth in the direction indicated by the arrow B. The serpentine grooves 226a of the first flow field 226 are connected between the air supply passage 58a and the air discharge passage 58b. Further, the first separator 222 has a second flow field 228 on a second surface 222b opposite to the first surface 222a. The second flow field 228 includes a plurality of grooves 228a in a serpentine pattern having two turn regions and three straight regions. The serpentine grooves 228a of the second flow field 228 are connected between the airs supply passage 58a and the air discharge passage 58b. By adopting the grooves 226a, 228a in the serpentine pattern, it is possible to increase the length of the grooves 226a, 228a, and increase the amount of water used for humidification.

The grooves (first flow grooves) 226a of the first flow field 226 and the grooves 228a of the second flow field 228 are formed alternately, and opposite ends of the grooves 226a, 228a are directly opened to the air supply passage 58a and the air discharge passage 58b.

In the first flow field 226, first seal members (seals) 230a, 230b are provided near the air supply passage 58a and the air discharge passage 58b. In the second flow field 228, second seal members 232a, 232b are provided. The second seal members 232a, 232b are offset inwardly from the first seal members 230a, 230b.

The second separator 224 has a third flow field 234 on a third surface 224a facing the other surface 50b of the water permeable membrane 50. The third flow field 234 includes a plurality of grooves 234a in a serpentine pattern having two turn regions and three straight regions for allowing the off gas to flow back and forth in the direction indicated by the arrow B. The serpentine grooves 234a of the third flow field 234 are connected between the off gas supply passage 60a and the off gas discharge passage 60b. Further, the second separator 224 has a fourth flow field 236 on a fourth surface 224b opposite to the third surface 224a. The fourth flow field 236 includes a plurality of grooves 236a in a serpentine pattern. The serpentine grooves 236a of the fourth flow field 236 are connected between the off gas supply passage 60a and the off gas discharge passage 60b.

The grooves (second flow grooves) 234a of the third flow field 234 and the grooves 236a of the fourth flow field 236 are formed alternately. In the third flow field 234, third seal members (seals) 238a, 238b are provided near the off gas supply passage 60a and the off gas discharge passage 60b. In the fourth flow field 236, fourth seal members 240a, 240b are provided near the off gas supply passage 60a and the off gas discharge passage 60b. The fourth seal members 240a, 240b are offset inwardly from the third seal members 238a, 238b.

When the first separator 222 and the second separator 224 are stacked together such that the water permeable membrane 50 is interposed between the first separator 222 and the second separator 224, first straight ridges 242a, 242b are formed on the first surface 222a of the first separator 222. The first straight ridges 242a, 242b are overlapped with the third seal members 238a, 238b in the stacking direction. The first straight ridges 242a, 242b extend in the direction indicated by the arrow C. The opposite ends of the first straight ridges 242a, 242b in the direction indicated by the arrow C close part of the grooves 226a. The first straight ridges 242a, 242b have flat upper surfaces extending in the direction indicated by the arrow C over the entire lengths of the third seal members 238a, 238b. Portions of the grooves 226a closed by the first straight ridges 242a, 242b are connected on the side of the grooves 228a by flow field connection openings 244a, 244b.

Further, when the first separator 222 and the second separator 224 are stacked together such that the water permeable membrane 50 is interposed between the first separator 222 and the second separator 224, second straight ridges 246a, 246b are formed on the third surface 224a of the second separator 224. The second straight ridges 246a, 246b are overlapped with the first seal members 230a, 230b in the stacking direction. The second straight ridges 246a, 246b extend in the direction indicated by the arrow C. The opposite ends of the second straight ridges 246a, 246b in the direction indicated by the arrow C close part of the grooves 234a. The second straight ridges 246a, 246b have flat upper surfaces extending in the direction indicated by the arrow C over the entire lengths of the first seal members 230a, 230b. Portions of the grooves 234a closed by the second straight ridges 246a, 246b are connected on the side of the grooves 234b by flow field connection openings 248a, 248b.

Figure 19:
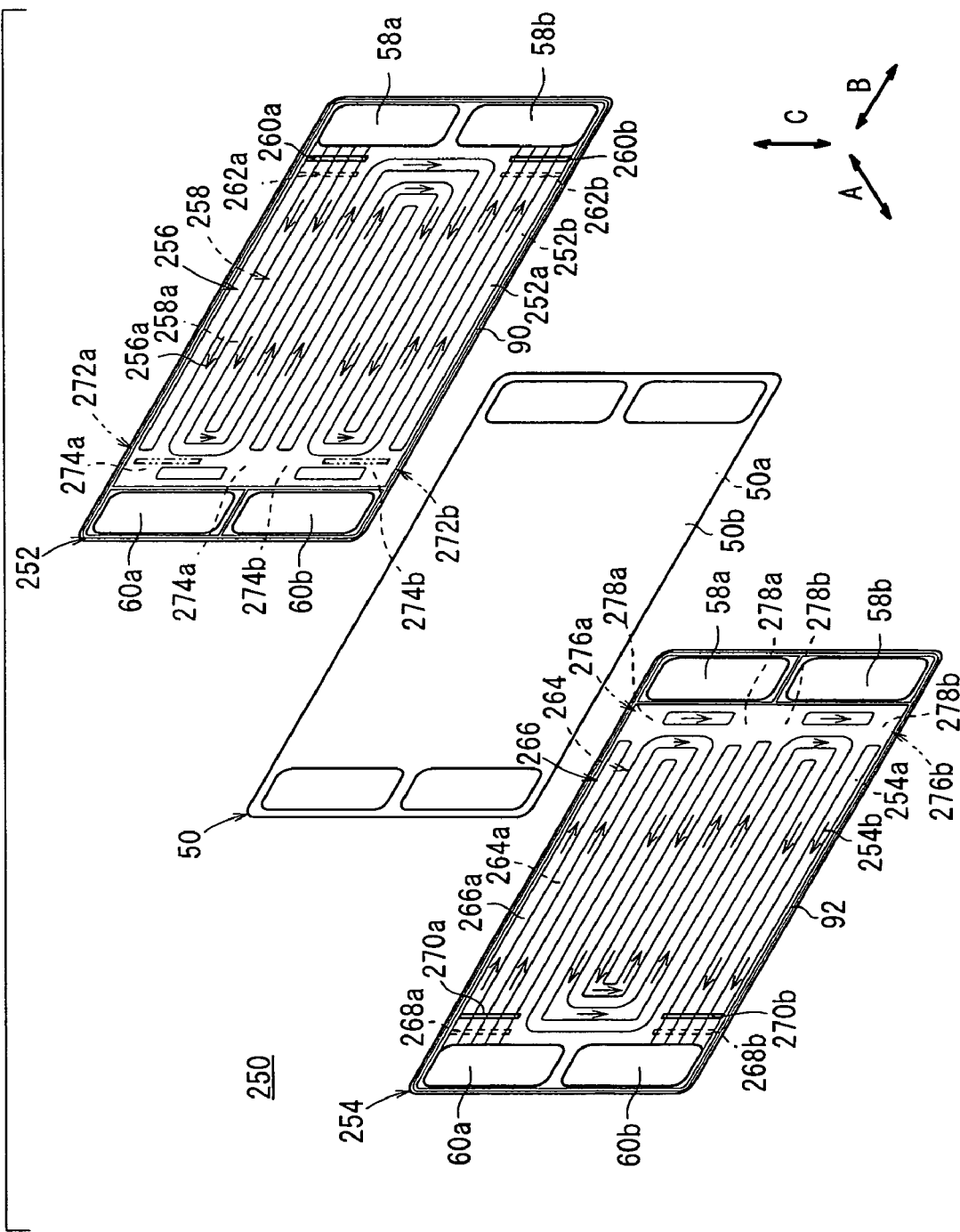
FIG. 19 is an exploded perspective view showing main components of a humidification apparatus according to an eighth embodiment of the present invention.

FIG. 19 is an exploded perspective view showing main components of a humidification apparatus 250 according to an eighth embodiment of the present invention.

The humidification apparatus 250 includes a first separator 252 and a second separator 254 which are provided alternately on one surface 50a of the water permeable membrane 50 and the other surface 50b of the water permeable membrane 50.

The first separator 252 has a first flow field 256 on a first surface 252a. The first flow field 256 includes a plurality of grooves 256a in a serpentine pattern having three turn regions and four straight regions for allowing the air to flow back and forth indicated by the arrow B. The serpentine grooves 256a of the first flow field 256 are connected between the air supply passage 58a and the air discharge passage 58b. Further, the first separator 252 has a second flow field 258 on a second surface 252b opposite to the first surface 252a. The second flow field 258 includes a plurality of grooves 258a in a serpentine pattern. The serpentine grooves 258a of the second flow field 258 are connected between the air supply passage 58a and the air discharge passage 58b.

First seal members (seals) 260a, 260b are provided near the inlet and the outlet of the first flow field 256. Further, second seal members 262a, 262b are provided near the inlet and the outlet of the second flow field 258. The second seal members 262a, 262b are offset inwardly from the first seal members 260a, 260b.

The second separator 254 has a third flow field 264 on a third surface 254a. The third flow field 264 includes a plurality of grooves 264a in a serpentine pattern having three turn regions and four straight regions for allowing the off gas to flow back and forth indicated by the arrow B. The serpentine grooves 264a of the third flow field 264 are connected between the off gas supply passage 60a and the off gas discharge passage 60b. Further, the second separator 254 has a fourth flow field 266 on a fourth surface 254b opposite to the third surface 254a. The fourth flow field 266 includes a plurality of grooves 266a in a serpentine pattern. The serpentine grooves 266a of the fourth flow field 266 are connected between the off gas supply passage 60a and the off gas discharge passage 60b.

Third seal members (seals) 268a, 268b are provided near the inlet and the outlet of the third flow field 264. Further, fourth seal members 270a, 270b are provided near the inlet and the outlet of the fourth flow field 266. The fourth seal members 270a, 270b are offset inwardly from the third seal members 268a, 268b.

First straight ridges 272a, 272b are formed on the first separator 252. The first straight ridges 272a, 272b are overlapped with the third seal members 268a, 268b of the second separator 254 in the stacking direction. The first straight ridges 272a, 272b have flat upper surfaces extending over the entire lengths of the third seal members 268a, 268b. Closed portions of the grooves (first flow grooves) 256a are connected on the side of the grooves 256b by flow field connection openings 274a, 274b.

Second straight ridges 276a, 276b are formed on the third surface 254a of the second separator 254. The second straight ridges 276a, 276b are overlapped with first seal members 260a, 260b of the first separator 252 in the stacking direction. Opposite ends of the second straight ridges 276a, 276b close the grooves (second flow grooves) 264a, and the second straight ridges 276a, 276b have flat upper surfaces extending over the entire lengths of the first seal members 260a, 260b. Portions of the grooves 264a closed by the second straight ridges 276a, 276b are connected on the side of the grooves 264b by flow field connection openings 278a, 278b.

Figure 20:
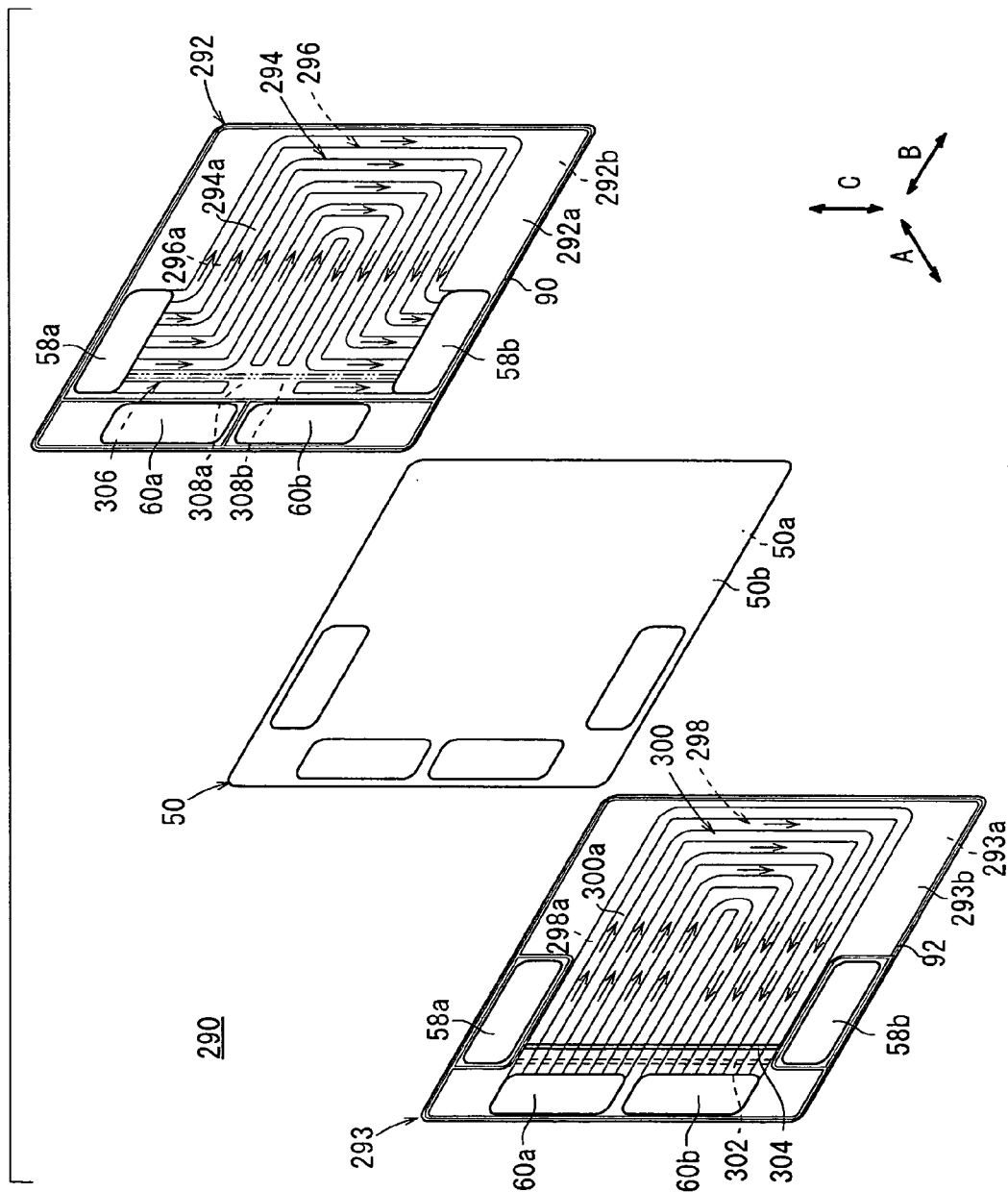
FIG. 20 is an exploded perspective view showing main components of a humidification apparatus according to a ninth embodiment of the present invention.
Figure 21:
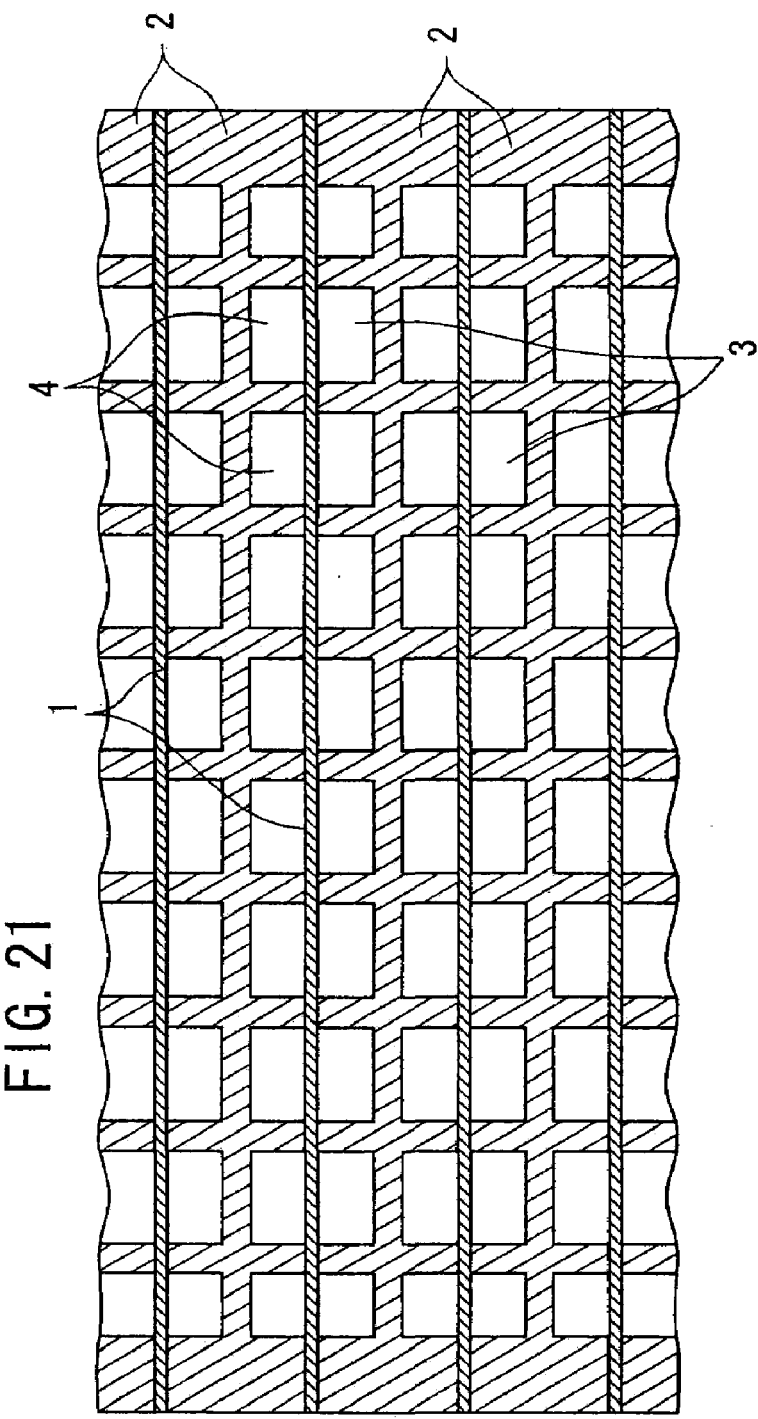
FIG. 21 is a partial cross sectional view showing a conventional humidification apparatus.

FIG. 20 is an exploded perspective view showing main components of a humidification apparatus 290 according to a ninth embodiment of the present invention.

The humidification apparatus 290 includes a first separator 292 and a second separator 293 which are provided alternately on one surface 50a of the water permeable membrane 50 and the other surface 50b of the water permeable membrane 50. At one end of the humidification apparatus 290 in the direction indicated by the arrow B, the off gas supply passage 60a and the off gas discharge passage 60b are provided. Further, in upper and lower portions at the one end of the humidification apparatus 290, the air supply passage 58a and the air discharge passage 58b are provided.

The first separator 292 has a first flow field 294 on a first surface 292a and a second flow field 296 on a second surface 292b. The first flow field 294 includes a plurality of grooves (first flow grooves) 294a curved in a U-shape. The curved grooves 294a of the first flow field 294 are connected between the air supply passage 58a and the air discharge passage 58b. The second flow field 296 includes a plurality of grooves 296a curved in a U-shape. The curved grooves 296a are connected between the air supply passage 58a and the air discharge passage 58b. The grooves 294a of the first flow field 294 and the grooves 296a of the second flow field 296 are formed alternately.

The second separator 293 has a third flow field 298 on a third surface 293a and a fourth flow field 300 on a fourth surface 293b. The third flow field 298 includes a plurality of grooves (second flow grooves) 298a curved in a U-shape. The curved grooves 298a of the third flow field 298 are connected between the off gas supply passage 60a and the off gas discharge passage 60b. The fourth flow field 300 includes a plurality of grooves 300a curved in a U-shape. The curved grooves 300a are connected between the off gas supply passage 60a and the off gas discharge passage 60b. The grooves 298a of the third flow field 298 and the grooves 300a of the fourth flow field 300 are formed alternately.

On the third surface 293a of the second separator 293, a seal member (seal) 302 is provided near the inlet and the outlet of the third flow field 298. On the fourth surface 293b of the second separator 293, a seal member 304 is provided near the inlet and the outlet of the fourth flow field 300. The seal member 304 is offset inwardly from the seal member 302.

A straight ridge 306 is formed on the first surface 292a of the first separator 292. The straight ridge 306 is overlapped with the seal members 302 of the second separator 293 in the stacking direction. The straight ridge 306 extends in the direction indicated by the arrow C, and closes the turn regions of the grooves 294a. The straight ridge 306 has a flat upper surface extending over the entire length of the seal members 302. Portions of the grooves 294a closed by the straight ridge 306 are connected on the side of the grooves 294b by flow field connection openings 308a, 308b.

In the seventh to ninth embodiments as described above, the same advantage as with the humidification apparatus 210 according to the six embodiment can be obtained.

While the invention has been particularly shown and described with reference to preferred embodiments, it will be understood that variations and modifications can be effected thereto by those skilled in the art without departing from the spirit and scope of the invention as defined by the appended claims.

What is claimed is:

1. A reactant gas humidification apparatus for humidifying at least one reactant gas supplied to a solid polymer electrolyte fuel cell by a humidifying fluid, said reactant gas humidification apparatus comprising:
   a first separator provided on one surface of a water permeable membrane; and
   a second separator provided on the other surface of said water permeable membrane, wherein
   at least said first separator has a first flow field on a first surface facing the one surface of said water permeable membrane and a second flow field on a second surface opposite to said first surface for allowing the same reactant gas or the same humidifying fluid to flow along said first flow field and said second flow field.

2. A reactant gas humidification apparatus according to claim 1, wherein said first separator is formed by corrugating a metal plate to have said first flow field and said second flow field.

3. A reactant gas humidification apparatus according to claim 1, wherein a passage extends through said first separator for allowing said reactant gas or said humidifying fluid to flow in a stacking direction, and to be supplied into said first and second flow fields.

4. A reactant gas humidification apparatus according to claim 1, wherein a first seal member for closing said first flow field is provided at least near an inlet of said first flow field; and
   a second seal member for closing said second flow field is provided at least near an inlet of said second flow field, and offset from said first seal member.

5. A reactant gas humidification apparatus according to claim 4, wherein recesses are formed in respective corrugated protrusions on both surfaces of said first separator, and said first seal member is provided in the recess on said first surface, and said second seal member is provided in the recess on said second surface.

6. A reactant gas humidification apparatus according to claim 1, wherein said first separator has a through hole for connecting said first flow field and said second flow field.

7. A reactant gas humidification apparatus according to claim 1, wherein said first separator and said second separator are stacked together alternately to form a stack such that said water permeable membrane is interposed between said first separator and said second separator.

8. A reactant gas humidification apparatus according to claim 1, wherein said second separator has a third flow field on a third surface facing the other surface of said water permeable membrane and a fourth flow field on a fourth surface opposite to said third surface for allowing the same humidifying fluid or the same reactant gas to flow along said third flow field and said fourth flow field.

9. A reactant gas humidification apparatus for humidifying at least one reactant gas supplied to a solid polymer electrolyte fuel cell by a humidifying fluid, said reactant gas humidification apparatus comprising:
   a first separator provided on one surface of a water permeable membrane; and
   a second separator provided on the other surface of said water permeable membrane, wherein
   said first separator has a first flow field on a first surface facing the one surface of said water permeable membrane and a second flow field on a second surface opposite to said first surface for allowing the same reactant gas or the same humidifying fluid to flow along said first flow field and said second flow field; and
   said second separator has a third flow field on a third surface facing the other surface of said water permeable membrane and a fourth flow field on a fourth surface opposite to said third surface for allowing the same humidifying fluid or the same reactant gas to flow along said third flow field and said fourth flow field.

10. A reactant gas humidification apparatus according to claim 9, wherein said first separator and said second separator are stacked together alternately to form a stack such that said water permeable membrane is interposed between said first separator and said second separator.

11. A reactant gas humidification apparatus according to claim 9, wherein said first separator is formed by corrugating a metal plate to have said first flow field and said second flow field, and said second separator is formed by corrugating a metal plate to have said third flow field and said fourth flow field.

12. A reactant gas humidification apparatus according to claim 9, wherein a reactant gas passage extends through said first separator and said second separator for allowing said reactant gas to flow in a stacking direction, and to be supplied to predetermined two of said first through fourth flow fields; and a humidifying fluid passage extends through said first separator and said second separator for allowing said humidifying fluid to flow in the stacking direction and to be supplied to the remaining two of said first through fourth flow fields.

13. A reactant gas humidification apparatus according to claim 9, wherein a first seal member for closing said first flow field is provided at least near an inlet of said first flow field;

a second seal member for closing said second flow field is provided at least near an inlet of said second flow field, and offset from said first seal member;

a third seal member for closing said third flow field is provided at least near an inlet of said third flow field; and a fourth seal member for closing said fourth flow field is provided at least near an inlet of said fourth flow field, and offset from said third seal member.

14. A reactant gas humidification apparatus according to claim 13, wherein recesses are formed in respective corrugated protrusions on both surfaces of said first separator, and said first seal member is provided in the recess on said first surface, and said second seal member is provided in the recess on said second surface; and recesses are formed in respective corrugated protrusions on both surfaces of said second separator, and said third seal member is provided in the recess on said third surface, and said fourth seal member is provided in the recess on said fourth surface.

15. A reactant gas humidification apparatus according to claim 9, wherein said first separator has a through hole for connecting said first flow field and said second flow field; and said second separator has a through hole for connecting said third flow field and said fourth flow field.

16. A reactant gas humidification method for humidifying at least one reactant gas supplied to a solid polymer electrolyte fuel cell by a humidifying fluid, comprising the steps of:

supplying the same reactant gas to a first flow field and a second flow field on both surfaces of a first separator provided on one surface of a water permeable membrane; and supplying the same humidifying fluid to a third flow field and a fourth flow field on both surfaces of a second separator provided on the other surface of said water permeable membrane for humidifying said reactant gas by said humidifying fluid.

17. A reactant gas humidification method according to claim 16, wherein a reactant gas passage extends through said first separator and said second separator in a stacking direction, and said reactant gas is supplied through said reactant gas passage to said second flow field of said first separator; and said reactant gas moves from said second flow field to said first flow field through a first through hole formed in said first separator, and thereafter, some of said reactant gas separately flows along said second flow field through a second through hole formed in said first separator.

18. A reactant gas humidification method according to claim 16, wherein a humidifying fluid passage extends through said first separator and said second separator in a stacking direction, and said humidifying fluid is supplied through said humidifying fluid passage to said fourth flow field of said second separator; and said humidifying fluid moves from said fourth flow field to said third flow field through a third through hole formed in said second separator, and thereafter, some of said humidifying fluid separately flows along said fourth flow field through a fourth through hole formed in said second separator.

* * * * *